Aug. 25, 1970    W. SCHNEIDER ET AL    3,525,131
PLANT FOR MANUFACTURING CONCRETE BLOCKS
Filed Dec. 14, 1967    22 Sheets-Sheet 3
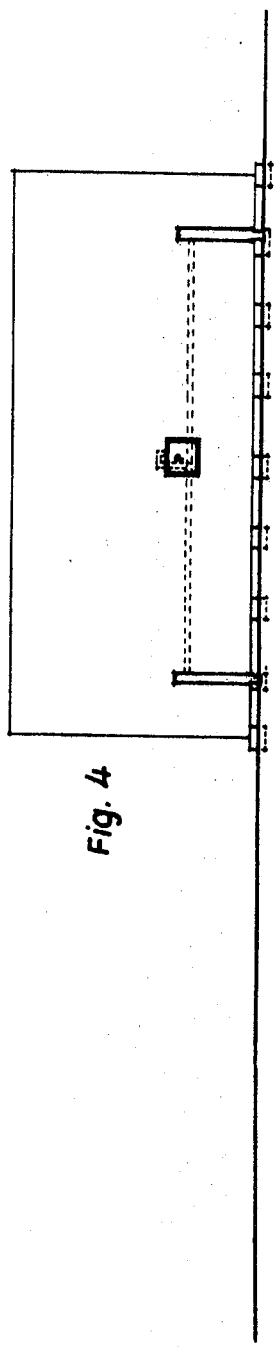
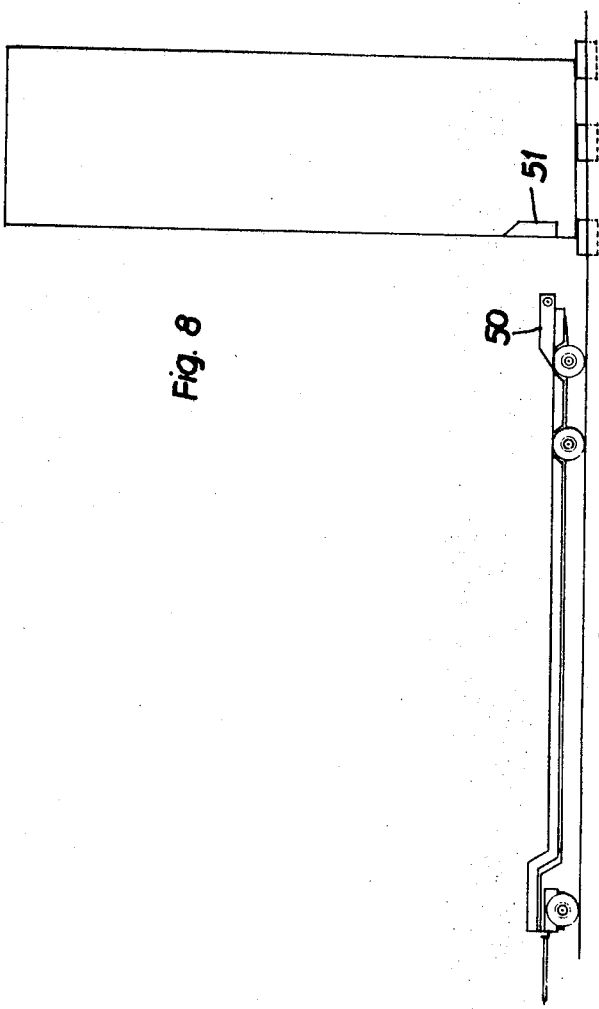
Inventors
WOLFGANG SCHNEIDER
KLAUS SCHNEIDER
By Young & Thompson
Attys.

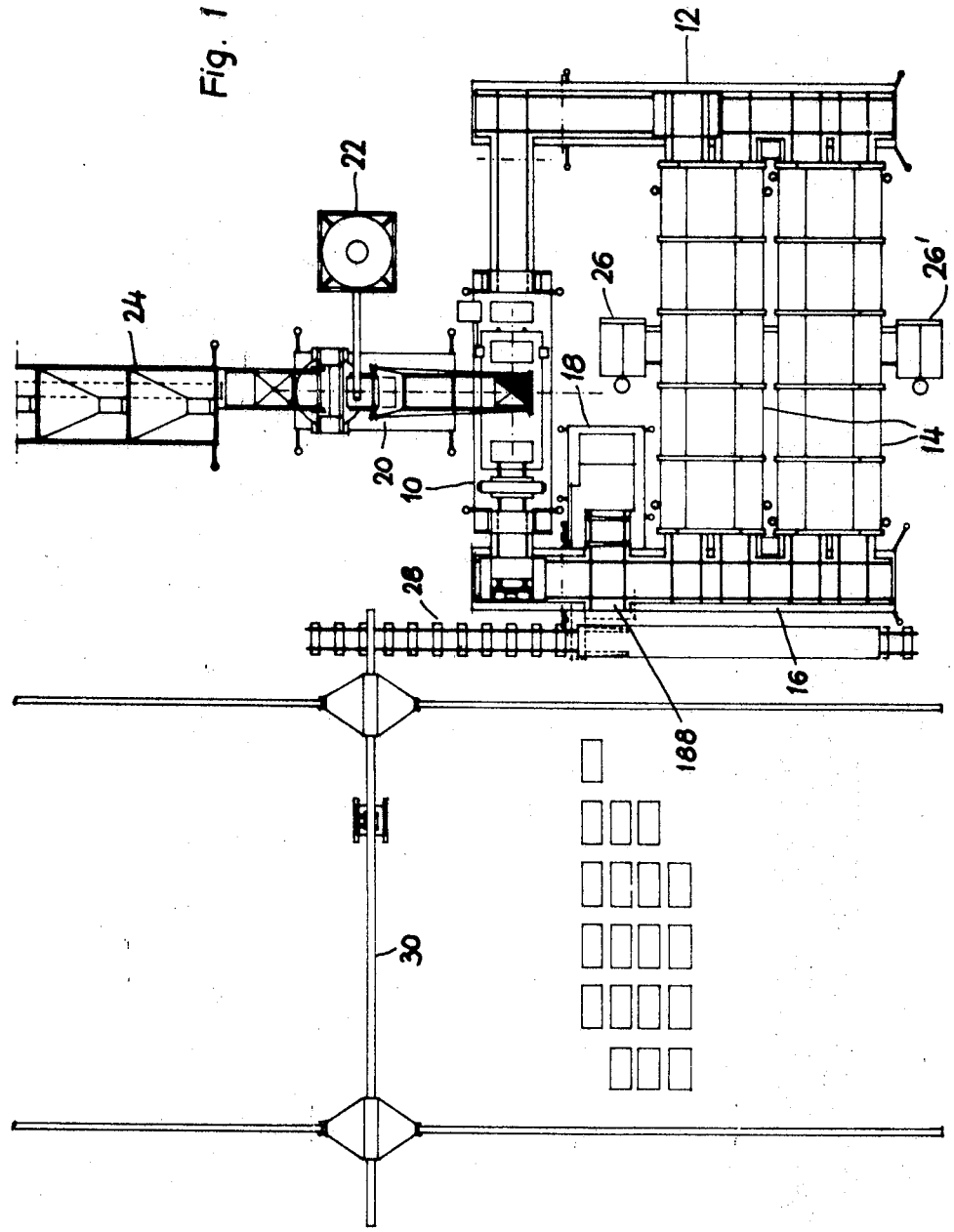

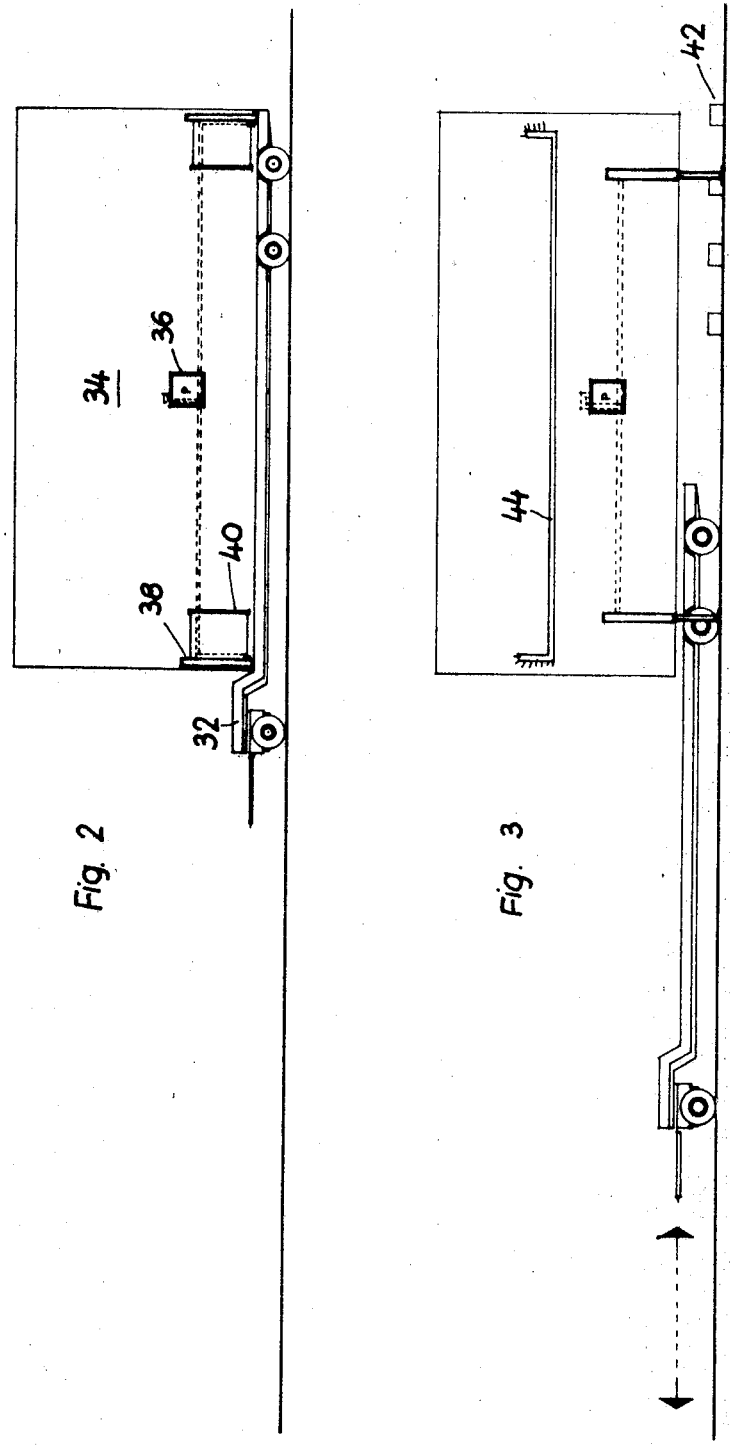

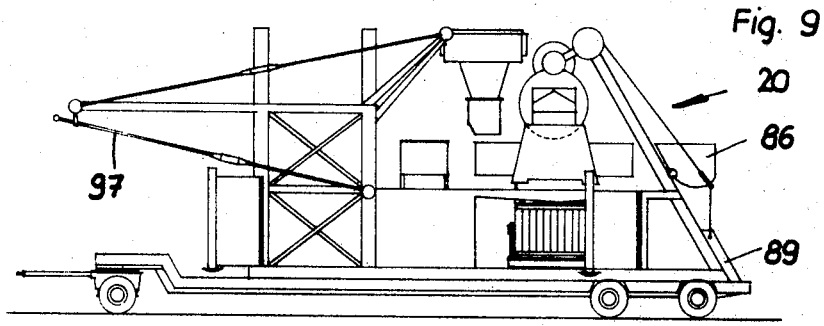
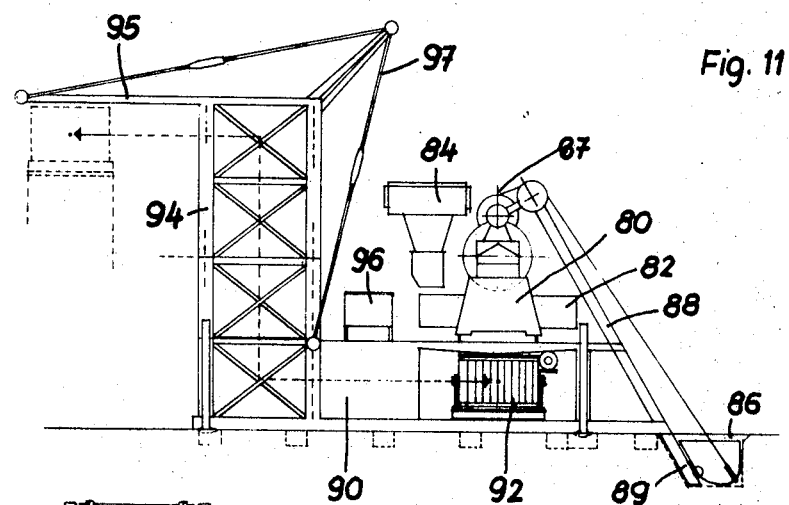
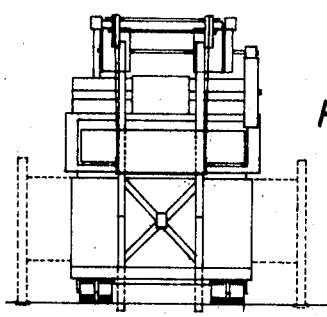
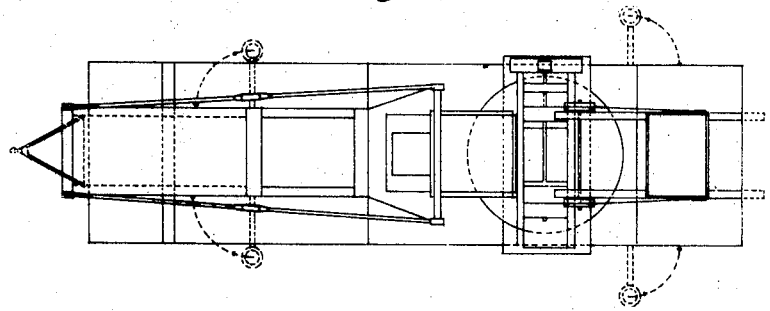

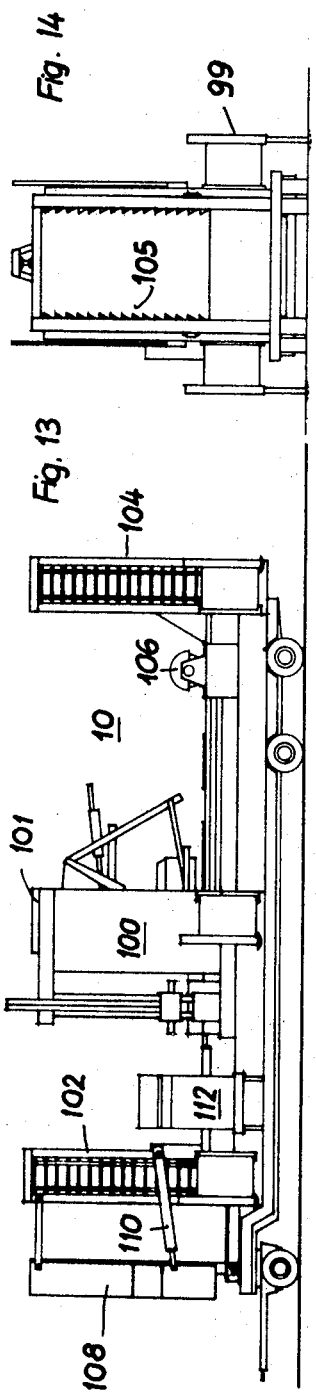
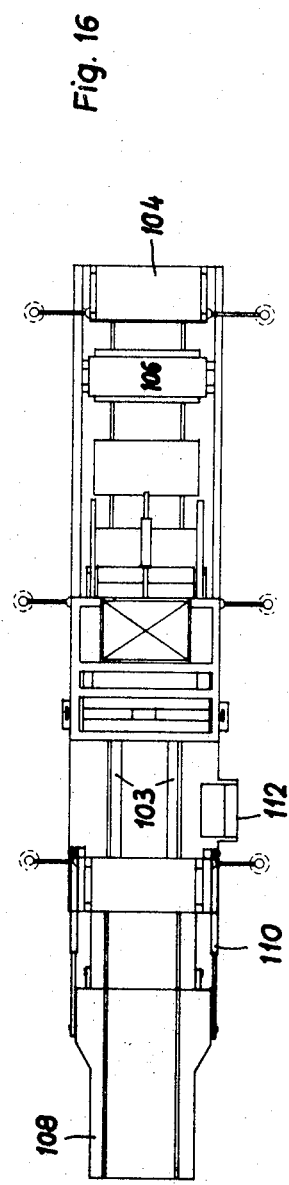
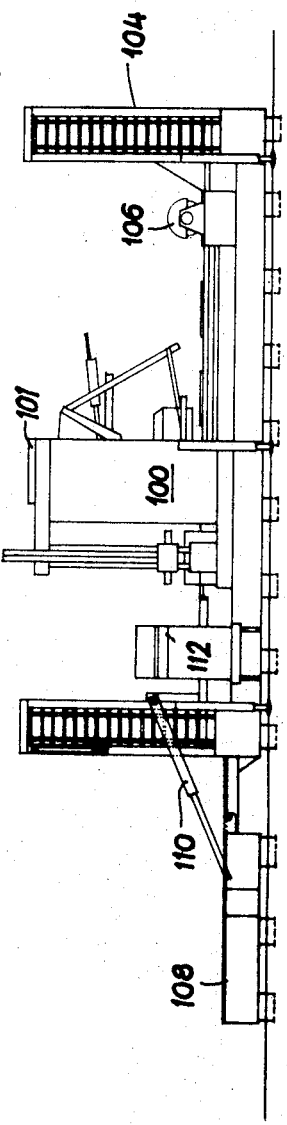

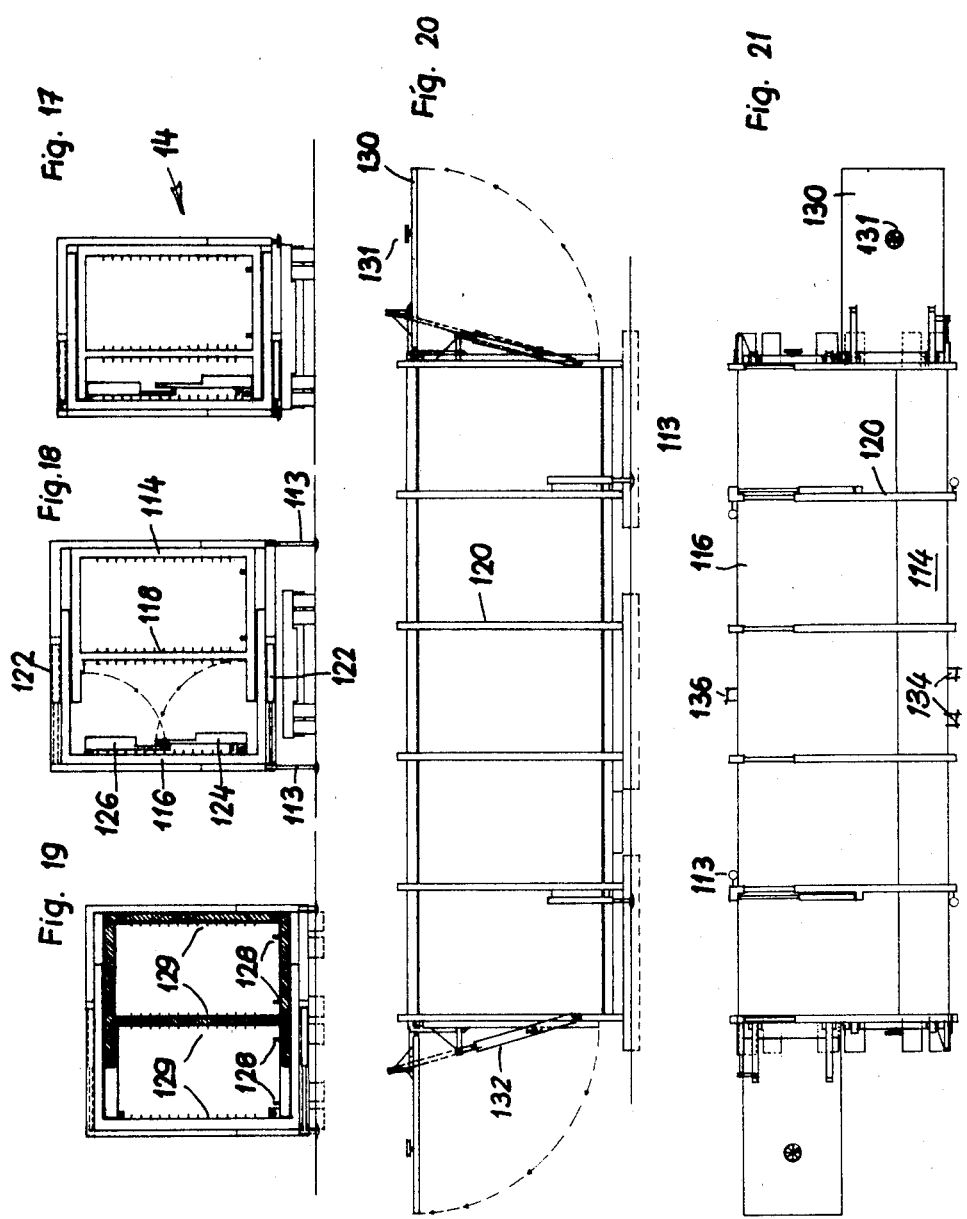

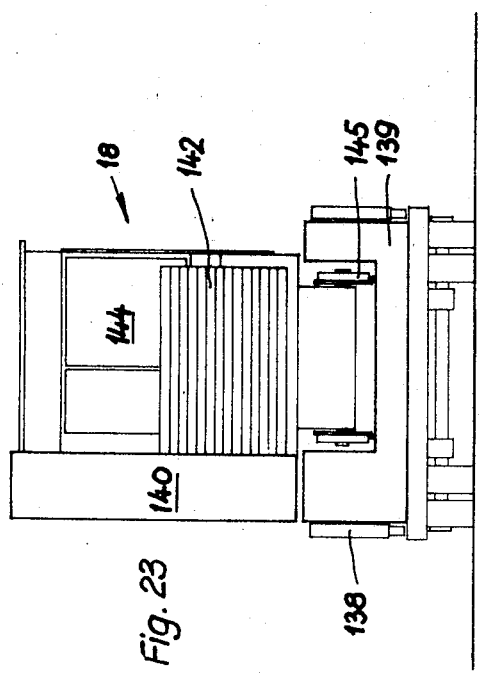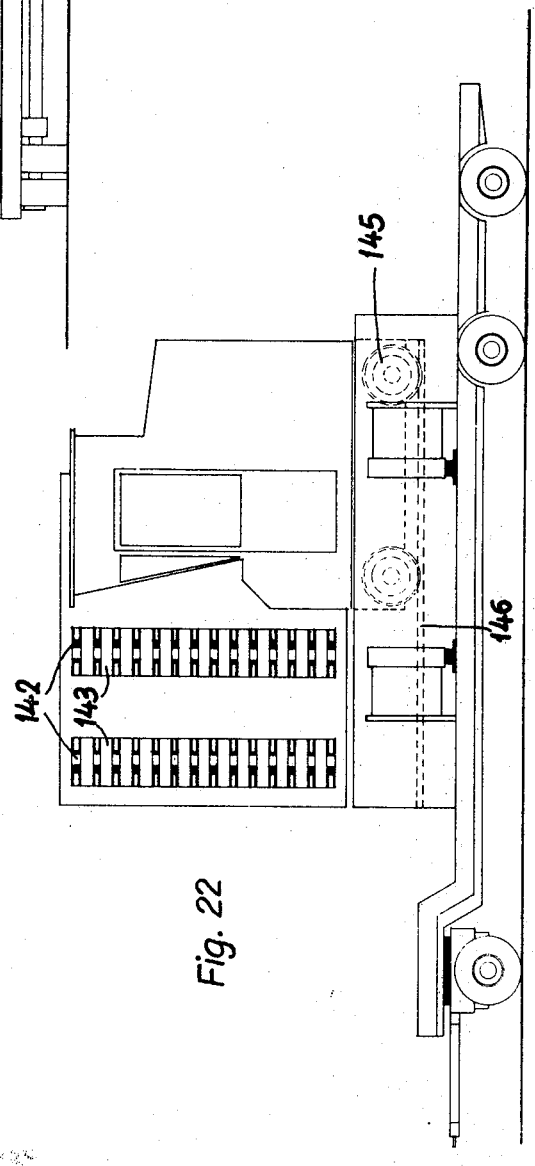

Aug. 25, 1970     W. SCHNEIDER ET AL     3,525,131

PLANT FOR MANUFACTURING CONCRETE BLOCKS

Filed Dec. 14, 1967     22 Sheets-Sheet 9

Inventors
WOLFGANG SCHNEIDER
KLAUS SCHNEIDER
BY Young & Thompson
ATTYS.

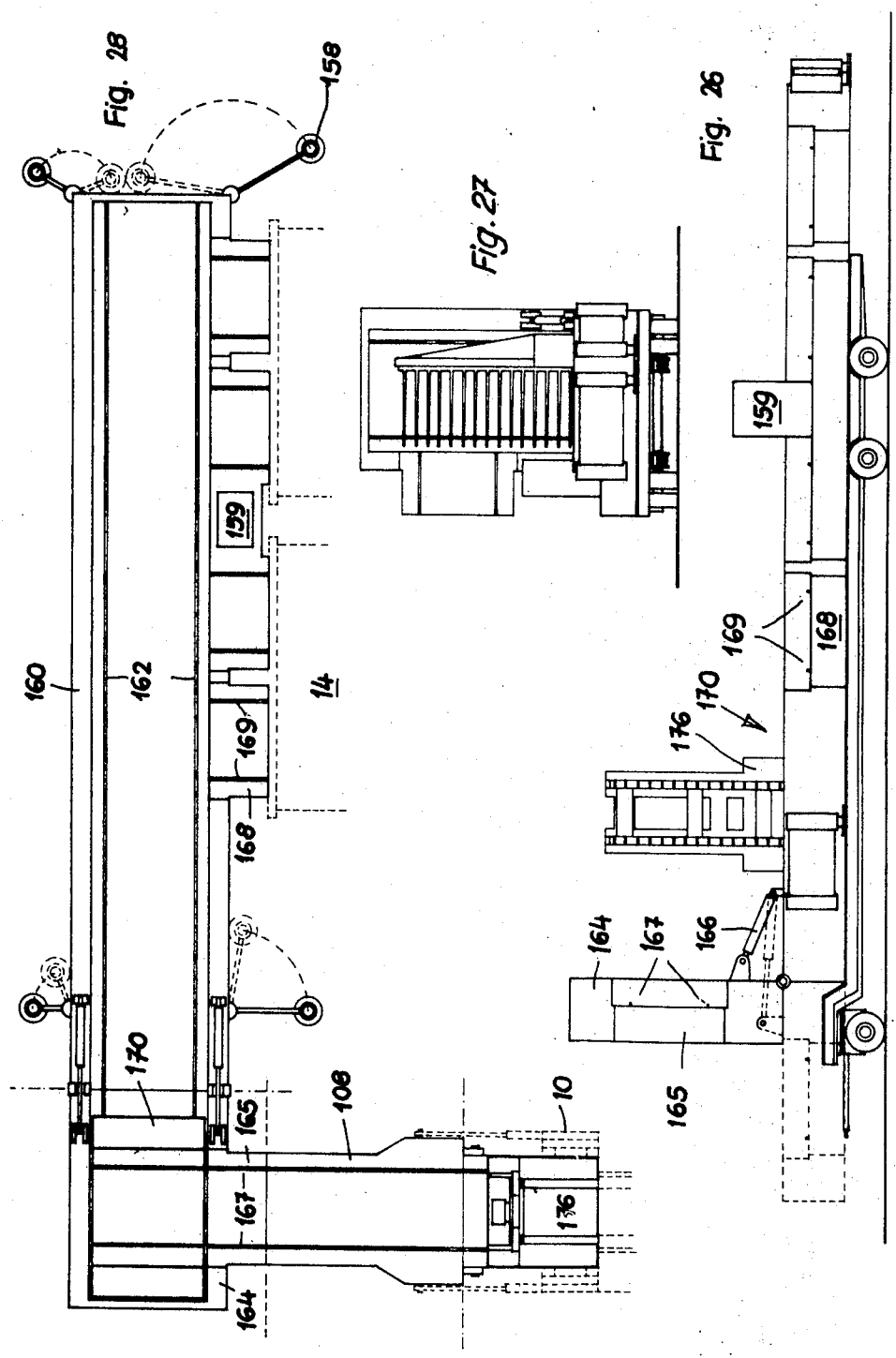

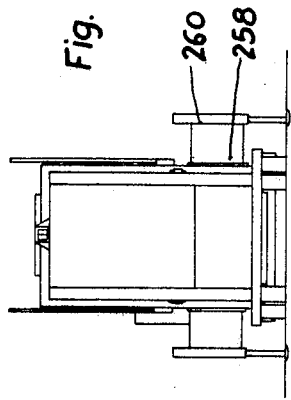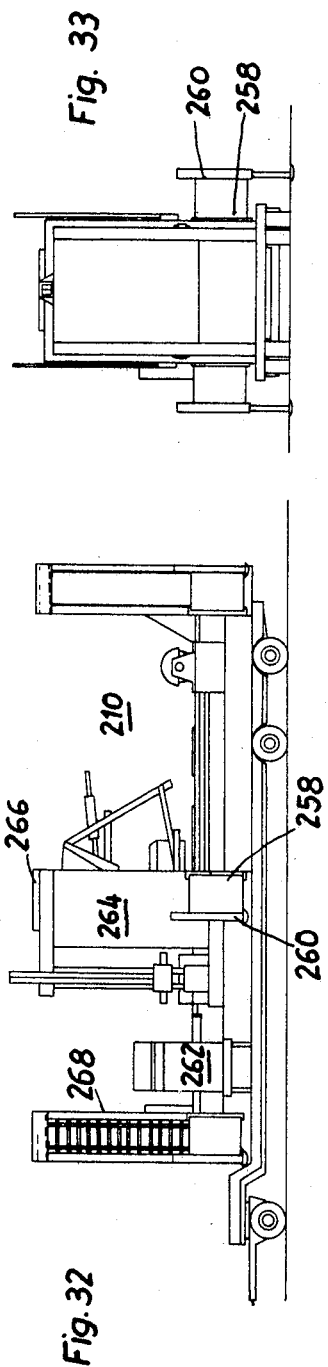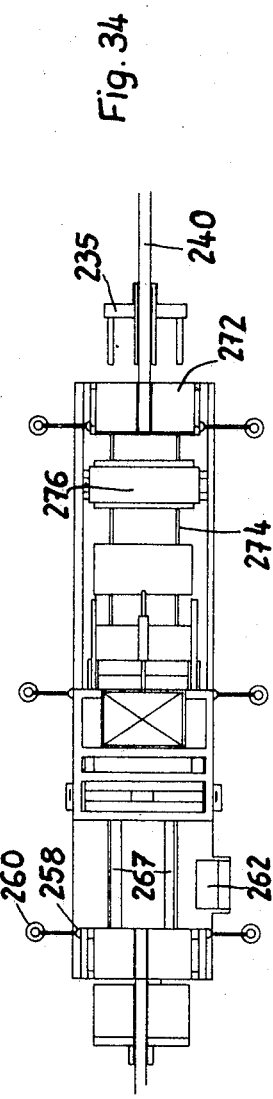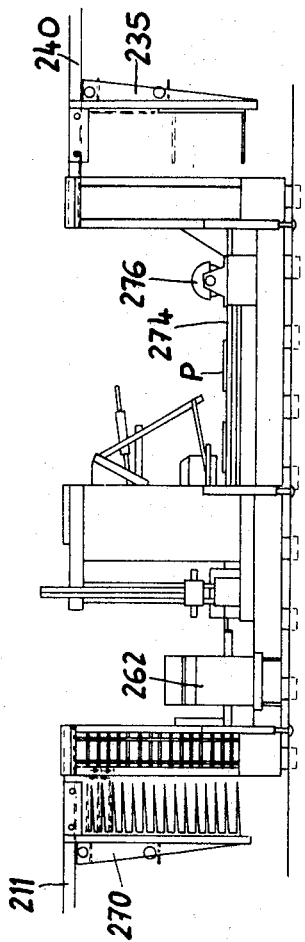

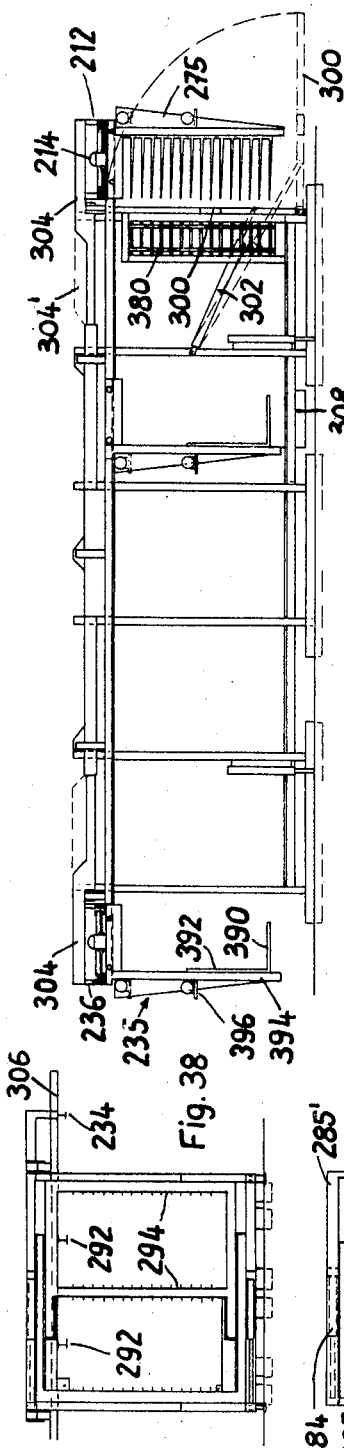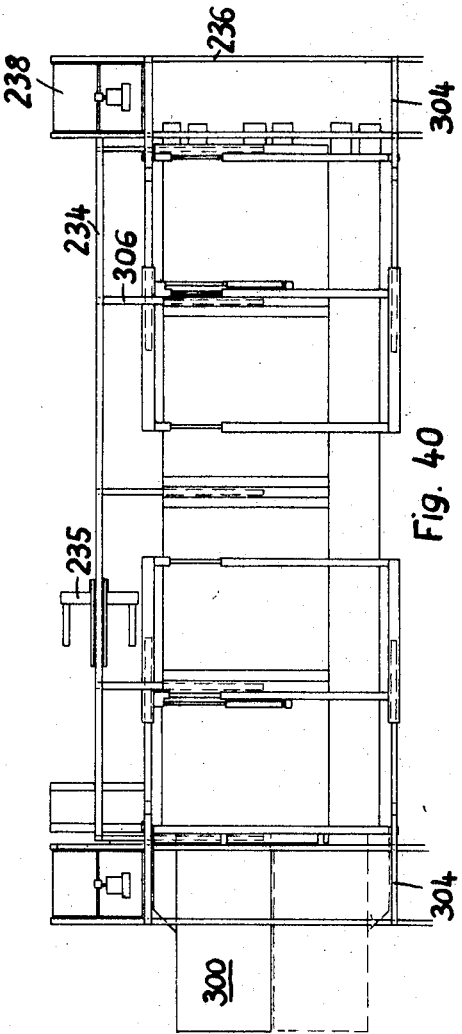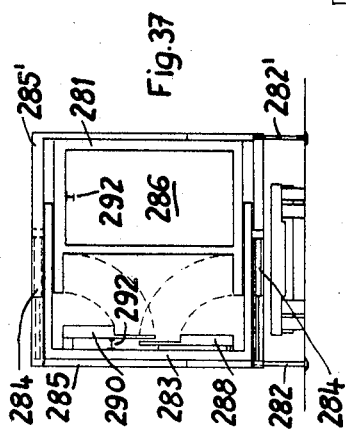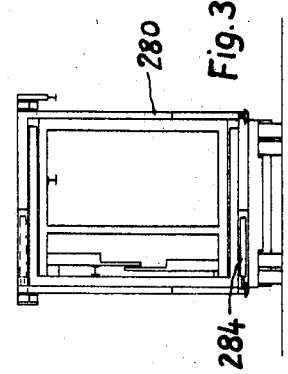

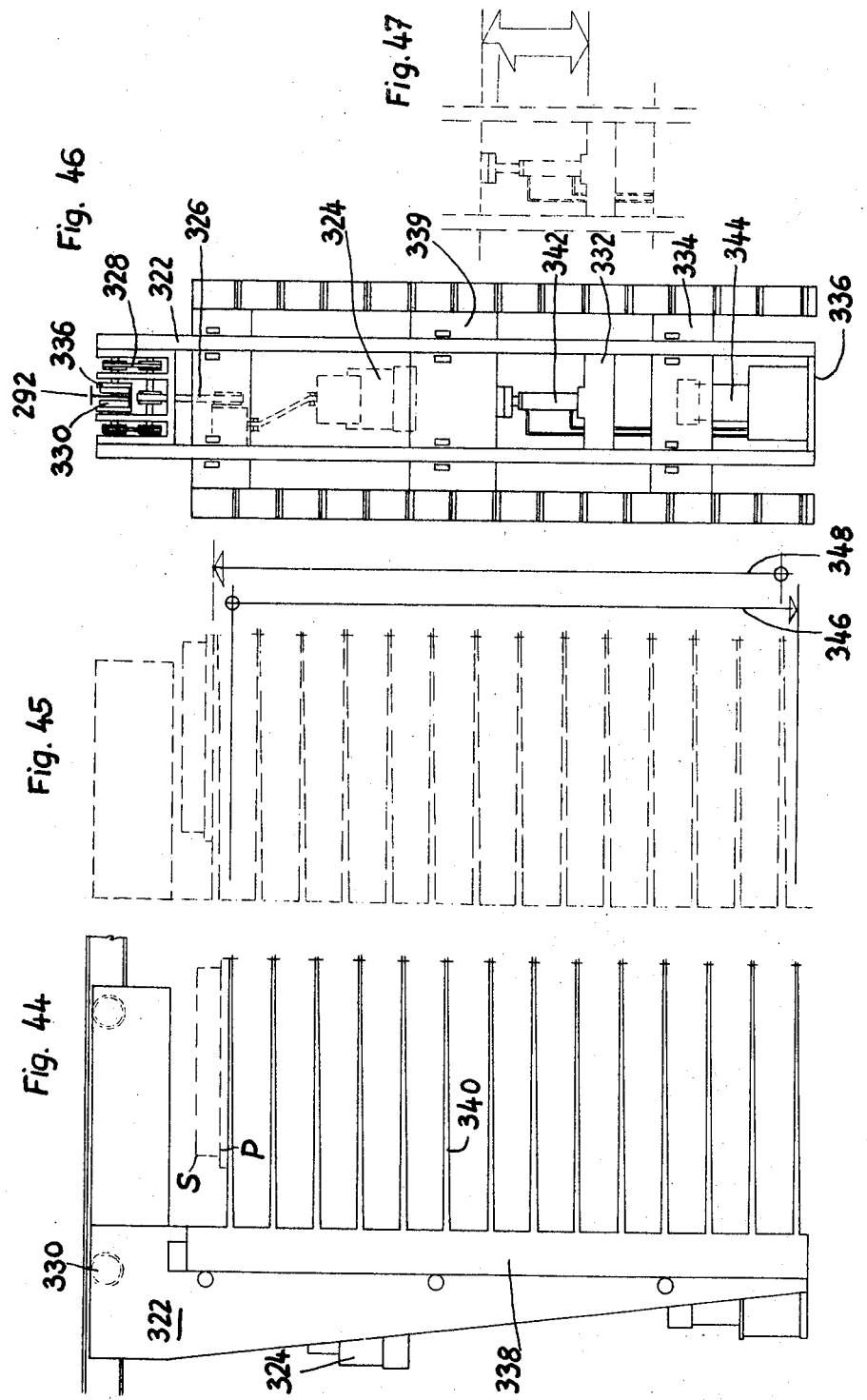

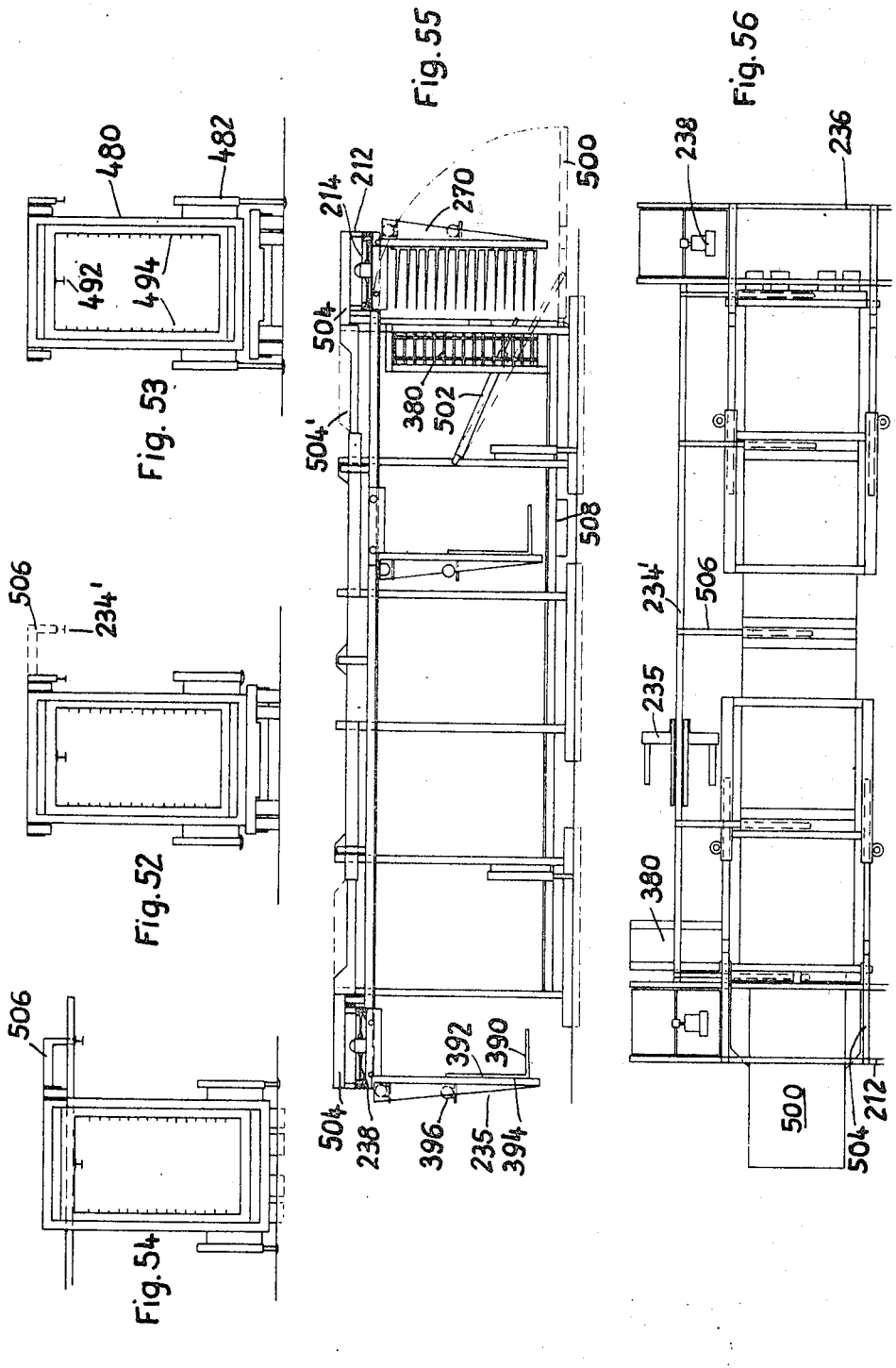

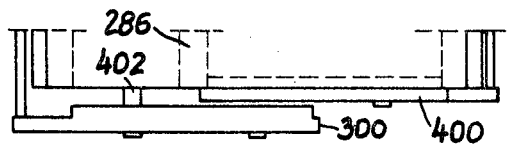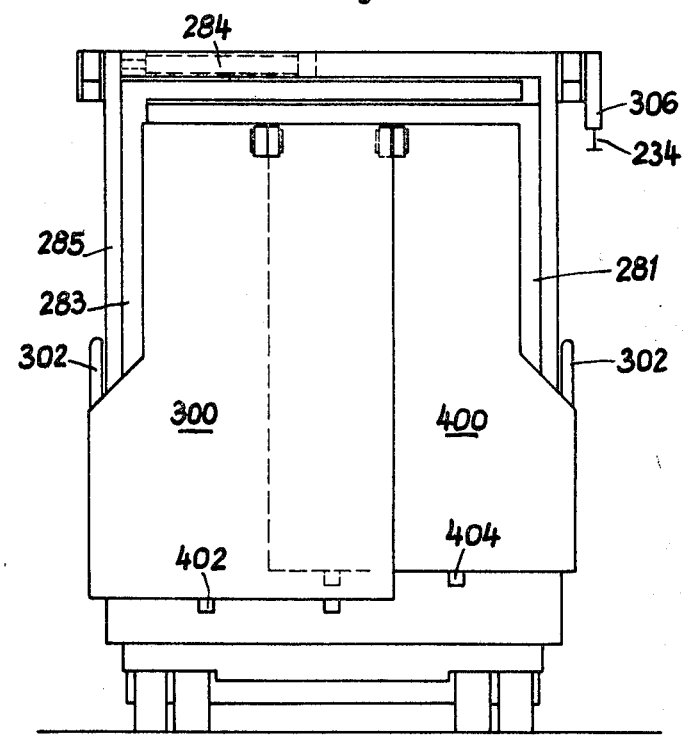

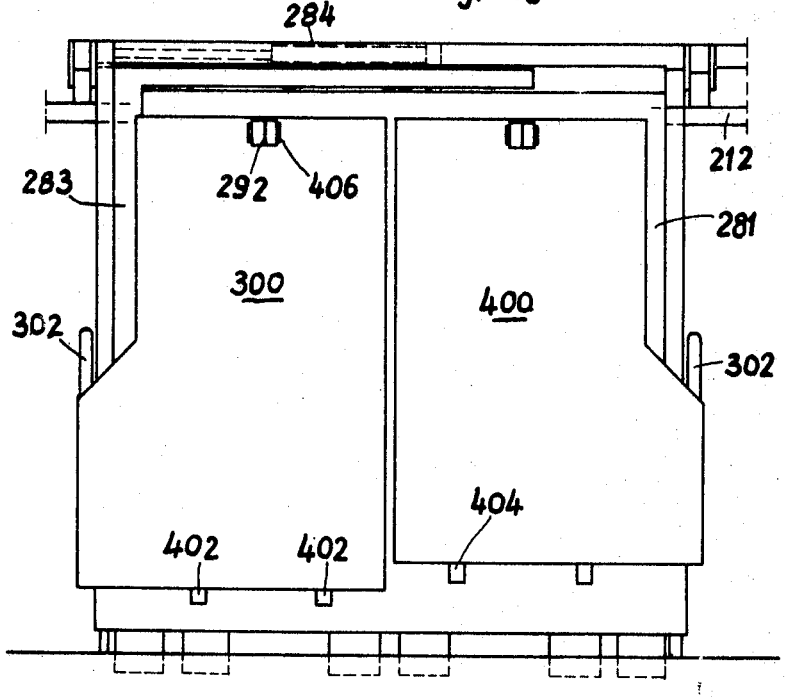

United States Patent Office 3,525,131
Patented Aug. 25, 1970

3,525,131
PLANT FOR MANUFACTURING CONCRETE
BLOCKS
Wolfgang Schneider, 8 Mushardweg, and Klaus
Schneider, 18, Feldweg, both of 215 Buxtehude,
Germany
Filed Dec. 14, 1967, Ser. No. 690,541
Claims priority, application Germany, Dec. 17, 1966,
Sch 39,980; May 3, 1967, Sch 40,645
Int. Cl. B28b 15/00
U.S. Cl. 25—2                                    32 Claims

ABSTRACT OF THE DISCLOSURE

A plant for manufacturing small structural concrete elements comprises a number of units which are adapted to be individually transportable so that the entire plant is portable. When in place, the units occupy only a very small area, as the pallets on which the concrete elements are transported are moved in a closed circuit from a production station through a hardening station to a delivery station and back to the production station.

---

The invention relates to a plant for manufacturing concrete blocks which consists, in general, of a silo station, a mixing station, a production station, a hardening station and a delivery station which may be connected by conveyor means in the sequence given here.

Small structural elements which may have the most varied shapes are often produced from high-density concrete and light-weight concrete and are used both in building construction and in civil engineering, particularly for road construction and hydraulic egineering in the latter field. Such concrete-block structural elements have hitherto been manufactured in stationary, relatively large works which were built in the vicinity of a consumer region and/or a source of raw materials. The manufacturers are concerned, in each case, to keep the expenditure for bringing up raw materials and taking away the finished products as low as possible. Nevertheless, it is repeatedly found that such works encounter sales difficulties after being in use for a relatively short time because, with the long life of the structural elements produced and the limited demand the consuming power of the immediate sales area is exhausted while deliveries cannot be made to more remote areas because of the excessive transport costs for the elements.

The great dependence of the known plants for manufacturing concrete blocks on their position is therefore extremely disadvantageous. The present invention is based on the fundamental idea of providing a plant for the manufacture of concrete blocks which is highly mobile. Accordingly, a plant for the manufacture of concrete blocks of the kind referred to is characterized according to the invention in that the devices forming the individual stations are adapted for mounting on carriers and for dismounting from these, the silo station, mixing station and production station being adapted for erection following directly one after the other and the production station and the hardening station being connected in a circle by the conveyor means on one section of which, between the exit from the hardening station and an entrance to the production station, there is situated the delivery station. With limited expenditure on additional means associated with the individual devices of the plant, it is possible for the whole plant to be completely erected at a new site or dismantled again after a task has been fulfilled, within a short time, for example within one day. The plant can be conveyed economically over long distances and so be erected wherever either raw materials, marketing conditions, or communication conditions are most favourable. In contrast to the conventional fixed works, foundations which consist of sleepers or like materials and which can easily be taken up again are sufficient for the plant according to the invention. Special consolidation of the ground, for example the provision of large concrete areas, and the erection of workshops are unnecessary.

The manufacturing plant according to the invention is preferably attached to gravel pits, fresh concrete works, bulk reloading centres or large-scale project sites. In these places, the relatively small area necessary to erect the individual stations and their equipment is also available. The difficulties which hitherto arose as a result of the fixed position and which frequently necessitated the establishment of branch works, are eliminated by the invention.

Further advantages and features of the invention are apparent from the following description and the drawings in which preferred embodiments are explained and illustrated by way of example.

FIG. 1 shows a lay-out for a manufacturing plant according to the invention;

FIGS. 2, 3 and 4 are diagrammatic illustrations of the lowering of a device associated with the manufacturing plant according to the invention from the carrier;

FIGS. 6, 7 and 8 are a simplified representation of the lowering of another device associated with the manufacturing plant according to the invention from a carrier;

FIG. 9 shows a mixing station associated with the plant according to the invention on a carrier in side elevation;

FIG. 10 shows the device of FIG. 9 seen from the input side, during the lowering;

FIG. 11 shows the device of FIGS. 9 and 10 in the operational state;

FIG. 12 shows a plan view of the device shown in FIGS. 9 to 11;

FIGS. 13, 14, 15 and 16 show a device serving as a production station for the plant according to the invention as shown in FIG. 1, in side elevation on a carrier, during the unloading seen from the input side, in side elevation in the unloaded state and in plan view after having been unloaded;

FIG. 17 shows a device serving as a hardening station for the manufacturing plant according to the invention as shown in FIG. 1, illustrated in diagrammatic section on a carrier;

FIG. 18 shows the device of FIG. 17 illustrated in the same manner during unloading;

FIG. 19 shows the device of FIGS. 17 and 18 illustrated diagrammatically in section after having been unloaded;

FIG. 20 shows the device of FIG. 19 in side elevation;

FIG. 21 shows the device of FIG. 19 in plan view;

FIGS. 22 and 23 show a device serving as a delivery station for the plant according to the invention as shown in FIG. 1 in side elevation and front elevation on a carrier;

FIG. 26 shows a conveyor device serving to connect the production station to the hardening station, on a transporter;

FIG. 27 shows the conveyor device seen from the right-hand end in FIG. 26;

FIG. 28 shows in plan view the device shown in FIG. 26 after having been unloaded, with the connections for the production station and the hardening station;

FIGS. 32, 33, 34 and 35 show a device serving as a production station for the plant according to the invention as shown in FIG. 31, in side elevation on a carrier, during the unloading seen from the input side, in plan view and in side elevation, the last two illustrations showing it in the unloaded state in each case;

FIG. 36 shows a device serving as a hardening station for the plant as shown in FIG. 31, illustrated diagrammatically in section on a carrier;

FIG. 37 shows the device shown in FIG. 36 illustrated in the same manner during its unloading;

FIG. 38 shows the device shown in FIGS. 36 and 37 illustrated diagrammatically in section in the unloaded state ready for operation;

FIGS. 39 and 40 show the device shown in FIG. 38 in side elevation and in plan view respectively;

FIGS. 44 and 45 to 47 illustrate a transfer carriage which is received by the trolley and comprises supports which are adjustable in height for pallets;

FIGS. 52–56 show illustrations corresponding to FIGS. 36–40 of a hardening device comprising only one hardening compartment;

FIGS. 57 and 58 are a front elevation and plan view of closing doors for the hardening device shown in FIG. 36;

FIGS. 59 and 60 are illustrations corresponding to FIGS. 57 and 58 of the closing doors in the operational state shown in FIG. 38.

Figure 5:
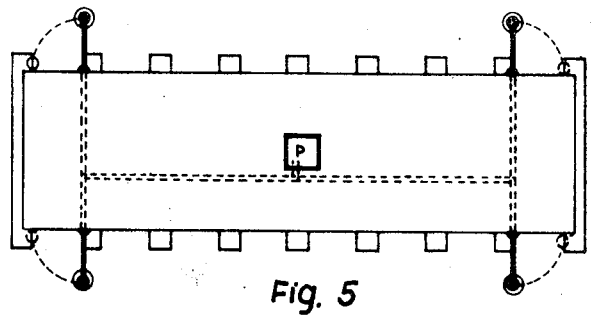
FIG. 5 is a plan view of a device associated with the manufacturing plant, illustrated in simplified form.

The lay-out illustrated in FIG. 1 affords a basic general view of the plant according to the invention. Its nucleus is formed by a production station 10, the output end of which is followed by a conveyor device 12 by means of which the unhardened concrete blocks coming from the production station are transferred to a hardening station 14. In the present case, the hardening station 14 consists of four steam-treatment tunnels which are combined in pairs to form a transportable unit. The output end of the hardening station 14 is followed by a conveyor device 16 which is similar in its basic construction to the conveyor device 12 and which is additionally provided with a connection for a delivery station 18. At the delivery station 18, the finished blocks coming from the hardening station are taken from the conveyor device 16 and desposited on wagons which are standing on a railway line 28 and from which a loading crane 30 takes the blocks for further stacking or loading.

The ready mixed concrete mass is supplied to the production station 10 from a mixing station 20. The mixing station 20 receives the raw materials from a silo station which contains a cement silo 22 and a group of hoppers 24 comprising a plurality of individual hoppers for the aggregate.

The hardening station works with steam which is generated in two steam generators 26, 26' which are connected to the hardening station through pipelines.

All the devices 10, 12, 14, 16, 18, 20, 22, 24 are distinguished in that they can be loaded onto low-loaders and unloaded from these without any cranes being necessary. A basic principle is illustrated in FIGS. 2 to 5. The unit 34, which is equipped with a complete hydraulic installation 36, is mounted on a low-bed trailer 32. The hydraulic installation comprises a conventional pump, a supply of pressure medium and a motor for driving the pump. The motor may be an electric motor for example which is supplied either by a generator or through a power mains connection available at the erection site. The unit 34 is provided with at least three hydraulic jacks 38. In the present case, the unit 34 comprises four such jacks 38 which are hinge-mounted on holders 40 secured to the ends of the longitudinal sides of the unit 34. In order to unload the unit 34, the jacks 38 are moved outwards on the holders 40 and the plungers in the jacks are extended until they come into contact with the ground. The jacks are adapted for actuation either simultaneously and uniformly or individually, an appropriate control being provided on the hydraulic device 36 for the purpose. In addition, at least one hose levelling instrument 44 is mounted on the unit 34 to permit observation of the position of the unit 34 during and after the unloading.

As soon as the unit 34 has been lifted sufficiently, the carrier 32 is pulled forwards. Then sleepers 42 are laid under the device which is lowered onto the sleepers 42 by renewed actuation of the jacks 38. Horizontal erection, independently of minor irregularities in the ground, is possible by observing the hose levelling instrument 44 and individual adjustment of the jacks 38. FIG. 4 shows the device fully set down in side view and FIG. 5 in plan view. The devices 10, 12, 14, 16, 18, 20 and 24 are constructed in accordance with the basic principle shown in FIGS. 2 to 5.

Figure 6:
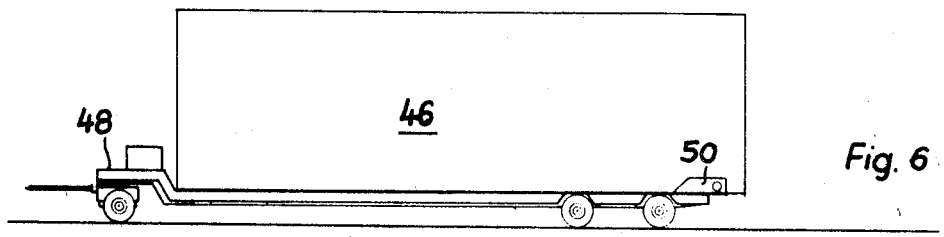
Figure 7:
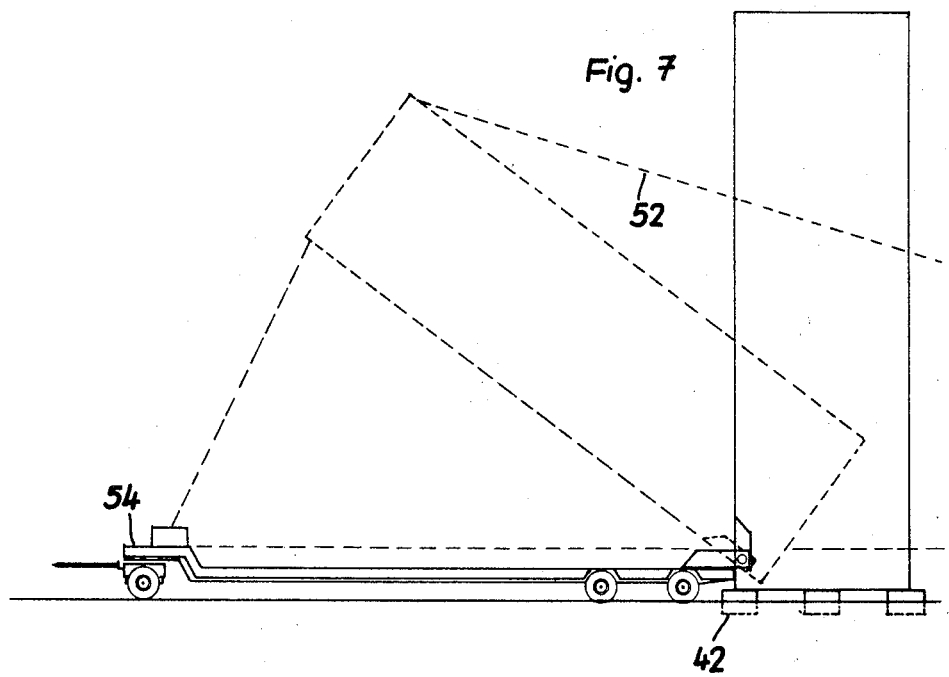
Figure 24:
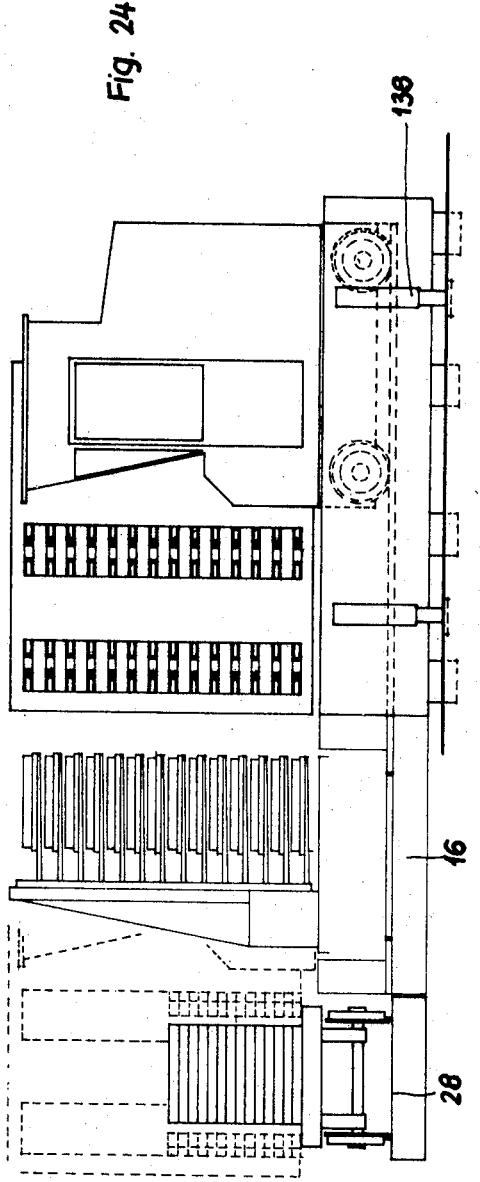
FIG. 24 shows the device shown in FIGS. 22 and 23 in side elevation during operation.
Figure 25:
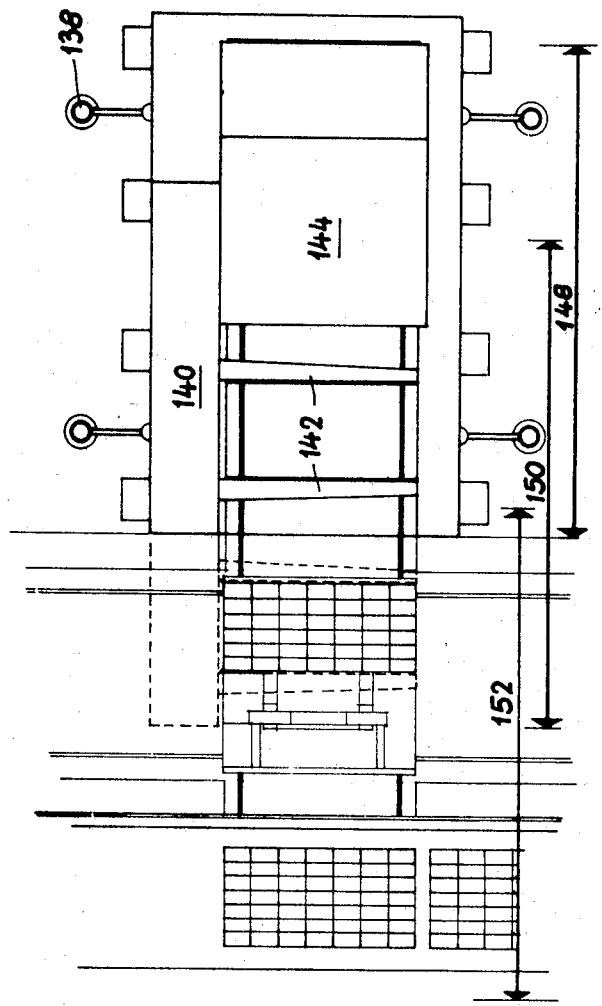
FIG. 25 shows a plan view of the device shown in FIG. 24.
Figure 29:
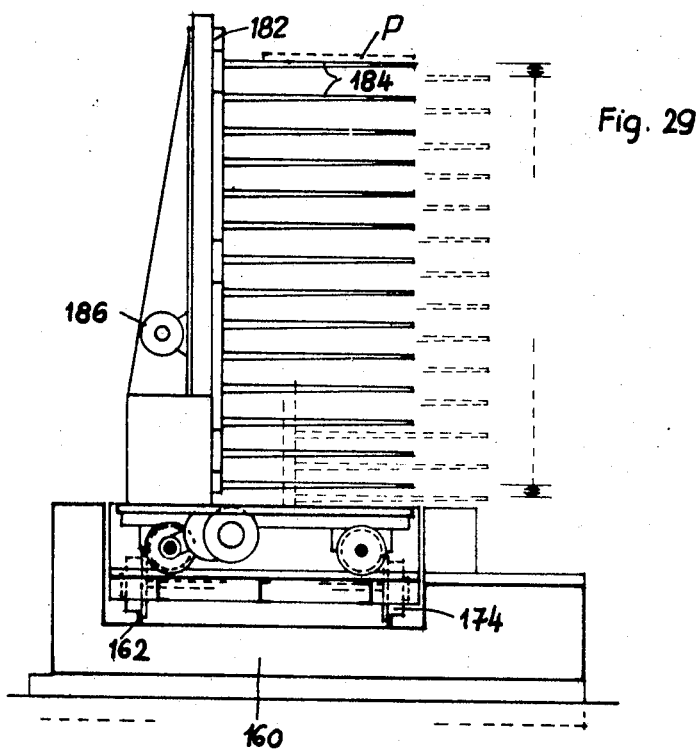
FIG. 29 shows a truck adapted for travel on the conveyor device in side elevation and FIG. 30 shows a side view of the truck illustrated in FIG. 29 turned through 90°.
Figure 30:
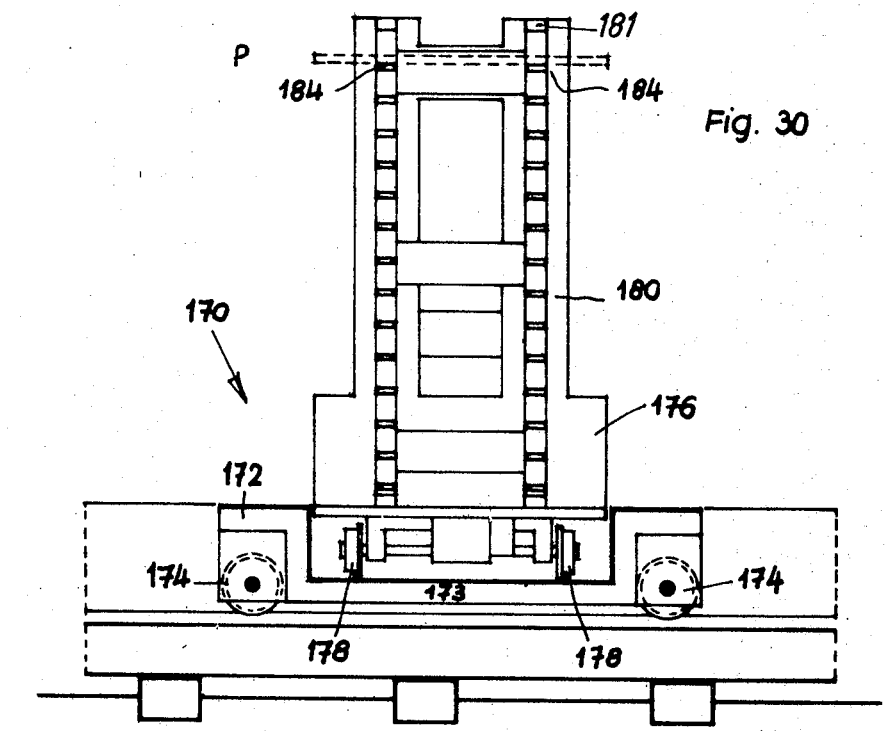

In the arrangement shown in FIGS. 6, 7 and 8, a unit. 46 rests on a low-bed trailer 48 from which it is tipped up for erection. For this purpose, devices 50 and 51, which together form a pivot with a pivot bearing, are provided at the lower end of the unit 46 and at the rear end of the trailer 48 respectively. For tipping up, the unit 46 is pulled upwards on cables 52 about the pivot device 50, 51. For this purpose, the cable 52 may, for example, be anchored in the ground at some distance from the trailer 48 which is secured by chocks, and be pulled in by a winch 54 until the unit 46 has been tipped up and deposited on the sleepers 42 at the rear end of the trailer 48. In the present example, the device 22 is constructed on this principle.

The loading of the units 34 and 46 respectively on the trailer is effected conversely. In this case, too. neither cranes nor auxiliary equipment are necessary so that the units can be reloaded on the trailer and driven away from the erection site again very quickly.

The mixing station 20, FIGS. 9 to 12, is constructed with jacks in the manner of the unit 34. The mixing station 20 comprises a conventional mixer of known construction which may have a capacity of 750 or 1000 litres for example. The mixer 80 is equipped with a mixing drum 82 above which an electrical weigh batcher 84 is mounted in such a manner that the measured quantity of cement flowing from the silo 22 can flow directly into the mixing drum. A bucket 86 is mounted, with a cable line 87, at the rear end of the mixing station 20 on an inclined hoist 88, the lower end 89 of which may be hinged. As a result, the bucket 86 can be lowered down into a pit in order to be filled with aggregate from the silo station 24. The station 24 is situated immediately in front of the mixing station for this purpose.

The mixer 80 is mounted raised on a frame 90. There is therefore sufficient room under the mixing drum 82 for the ready mixed concrete to be able to fall out of the drum 82 vertically downwards into a bucket 92 in which the concrete is conveyed to the production station.

In order that the ready mixed concrete may not separate during the conveying, the conveyor section for the bucket 92 is composed only of horizontal and vertical paths. For this purpose, the mixing station 20 is provided with a vertical latticed mast 94 which can be extended telescopically and which serves as a hoist shaft. The mast is retracted during the transport of the station, see FIG. 9, and is extended in operation, see FIG. 11. The bucket 92 is driven, freely suspended on the jib 95 of the mast 94, over the bunker of the following production station 10 so that there is no connection between the two stations subject to vibration. The bucket 92 has a hinged bottom which is opened by striking against a stop at the end of the jib 95 whereupon the bucket is emptied and then driven back under the mixing drum 82. The bottom is folded back again for entry into the mast 94.

The hydraulic device for the unloading mechanism and the control installation for the mixing station 20, which likewise works fully automatically, are combined to form one unit. Motors and cable lines which are actuated electrically serve to drive the bucket 92 and the bucket 86. The mast is preferably extended and retracted respectively by power-actuated means not illustrated, for example a hydraulic system or cable lines, the bracing 97 being reversed in each case, see FIGS. 9 and 11.

The production station 10, see FIGS. 13 to 16, is provided with hydraulically actuated jacks 99, in accordance with the illustrations shown in FIGS. 2 to 5, which are hinge-mounted at the longitudinal sides of the station. The station is unloaded onto sleeps which are laid on the ground after the jacks have been extended and the low-loader has been withdrawn from beneath the station. If necessary, the bearing pressure may be still further distributed by disposing mats below the sleepers. A hose levelling instrument, not illustrated, but similar to the hose levelling instrument 44, permits constant supervision of the position of the production station 10 during operation and, if necessary, an adjustment in position may be effected by means of the jacks 99 which can be actuated individually.

A production machine 100, known per se, is mounted on the fixed base of the production station 10. The production station 10 is erected in such a manner that, together with the mixing station 20, it forms a T and the mouth of the shaft 101 of the bunker of the production machine is situated immediately below the outer end of the jib 95 of the mixing station. The bucket 92 of the mixing station can therefore be emptied into the bunker of the production machine 100 without parts of the production station and the mixing station coming into contact with one another.

In the illustration in FIGS. 13, 15 and 16, the direction of operation in the production station is from right to left. Mounted on the right in front of the production machine 100 is a lowering ladder 104 which serves as a pallet store and from which the pallets are supplied, through a pallet cleaning device 106, to the production machine 100. The pallets coming out of the machine 100 and charged with precast units are transferred to a raising ladder 102. Mounted in front of the raising ladder is a rail bridge 108 which is folded up by hydraulic cylinders 110 for transport in order to maintain the total permissible length of the device 10, and is folded down in the operating position, see FIGS. 15 and 16. The rail bridge 108 is connected, by means of rapid locking devices, to a rail of similar construction which forms part of the conveyor device 12 so that the pallets loaded with precast units can be removed from the ladder 102 over the rail bridge.

The whole control and hydraulic installation is combined in a housing 112 which is mounted on a platform running in a guide. During operation, the housing 112 is withdrawn laterally from the path of movement of the pallets, see FIG. 16. Conversely, during transport, the housing 112 is pushed in sideways again into the base of the production station in order that the maximum permissible transport width for the production station may not be exceeded.

The hardening station 14 consists of at least one, preferably two, double tunnels, see FIGS. 17 to 21. Each double tunnel of the hardening station 14 is provided with hydraulic jacks 113 like the unit 34, see FIGS. 2 to 5. In the embodiment illustrated here, the jacks 113 cannot be swung out but are mounted on the lateral face of two shells 114, 116 which form the outer walls of the tunnels and which are slid one inside the other for transport, see FIG. 17. In order to erect the double tunnel, the shells 114, 116 are first driven apart. For this purpose, hydraulic cylinders 122 are provided which connect hoops 120 which are secured externally to the shells 114 and 116. After the shell 114 has been pushed laterally out of the shell 116, the jacks 113 are actuated as a result of which the double tunnel is lifted from the low-loader and this can be withdrawn from beneath the double tunnel. Then the double tunnel is deposited on sleepers. In this case, too, individual actuation of the jacks 113 permits the precise alignment of the double tunnel in a horizontal position or a re-adjustment in the event of this becoming necessary in the course of operation.

A vertical longitudinal wall 118 separates the two lines of tunnelling in the double tunnel from one another. Mounted in the shell 116 are hinged floor and ceiling members 124 and 126 respectively which lock the tunnel shells in the operational position as a result of being respectively raised and lowered after the shells 114 and 116 have been pulled apart.

The floors of the tunnels are provided with rails 128 on which trucks can bring up and take away pallets loaded with precast units. Inside the tunnel, the pallets are received by holding means 129 projecting laterally. Each line of tunnelling is provided at each end with a drop door 130 which can be swung upwards by a hydraulic cylinder 132. An additional locking means provided for the doors can be actuated by means of a hand wheel 131. Each tunnel comprises connection sockets 134 and 136 respectively which serve for the supply and removal of steam for hardening purposes.

The shells 114 and 116 as well as the intermediate wall 118 and the corresponding floor portions of the lines of tunnelling are preferably double-walled and made of metal, an insulating layer being provided between the walls. The members 120 ensure the necessary stiffening of the shells 114 and 116, together with the internal locking means 124, 126.

The delivery station 18, see FIGS. 22 to 25, like the unit 34, is provided with hydraulically actuated jacks 138 which are mounted on the fixed base 139 of the station for swinging outwards. The delivery station 18 comprises a vertical frame 140 on which are mounted multiple-part tongs which consist of a plurality of pairs of jaws 142 which are mounted precisely one above the other and which can be actuated simultaneously and in the same sense. The frame 140 is fixed to a truck 144 which is adapted to travel by means of wheels 145 on rails 146 which lie in the base 139. The two jaws of a pair of jaws 142 are adjustable in the horizontal plane; in addition, the pairs of jaws 142 situated one above the other and between which there are gaps 143 are adjustable vertically so that the gaps 143 can be increased or reduced to such an extent, see FIG. 23, that the pairs of jaws 142 lie directly one on top of the other. These tongs serve to grasp precast units disposed one above the other in a plurality of planes simultaneously with the pairs of jaws.

The rails 146 have a continuation in the conveyor device 16 so that the truck 144 with the frame 140 and the tongs formed by the pairs of jaws 142 can either be completely withdrawn, see double arrow 148, or can adopt the position projecting into the conveyor device 16, see double arrow 150, or a completely advanced position, see double arrow 152. It is of course to be understood that the double arrows 148, 150 and 152 indicate the different positions of the truck 144. When the truck 144 is in the position 150, the pairs of jaws 142 first take over from the conveyor device the precast units present thereon. Then the truck 144 travels back into the position 148. The pairs of jaws 142 may be lowered to such an extent that the precast units held in the pairs of jaws form a solid pile. After the section of the conveyor device 16 situated in front of the station 18 has become free, the truck 144 travels into the position 152 whereupon the precast units held in the pairs of jaws 152 are deposited, firmly stacked one on top of the other, on a platform truck which is standing on the line 28.

When the pairs of jaws 142 are pushed tightly together the jaws situated one above the other form two vertical walls which, because of the simultaneous actuation of the pairs of jaws, can be moved horizontally apart or together as a whole. The device is controlled from the truck 144 which contains the necessary hydraulic installations for actuating the tongs as well as a counter weight in order that the tongs filled with precast units may be counterbalanced during the individual operations. The truck 144 may be driven electrically in which case the necessary control devices are mounted on a control platform inside the truck. The position of the delivery station is also supervised from this control platform and can be re-adjusted if necessary by means of the hydraulic jacks 138 adapted for actuation individually.

Further details of the mode of operation of the delivery station 18 will be explained in connection with the conveyor device 16.

The stations 10 and 14 or 14, 18 and 10 respectively are connected by the conveyor devices 12 and 16 to form a closed circuit. The conveyor device 12 is illustrated in detail in FIGS. 26 to 30. Fundamentally, the conveyor device 16 has the same construction as the conveyor device 12 but is in mirror-image thereof. Further additions to the conveyor device 16 are explained below.

In its fundamental arrangement the conveyor device 12 corresponds to the unit 34. The conveyor device 12 is provided with hydraulic jacks 158 which are mounted for swinging outwards at the longitudinal sides or at the end of the trough-shaped base 160 of the device 12. The means necessary for the actuation and control of the hydraulic jacks 158 and the other hydraulic devices are combined in a housing 159 which is built onto the side of the trough-shaped base 160. The device 12 is conveyed on a low-loader as explained in conjunction with FIGS. 2 to 5 and can be unloaded from the trailer by appropriate actuation of the jacks 158 and erected at the place of use. Any deviations in position which may occur in the course of operation can be compensated by individual actuation of the jacks 158.

There are rails 162 in the base 160. In the present case, the base 160 comprises a hinged extension 164 which is raised by means of hydraulic cylinders 166 in order to adhere to the maximum length for road transport and is lowered onto the ground for operation after the device has been unloaded. This extension 164 can be connected to the hinged bridge member 108 of the production station 10. For this purpose, the extension 164 has a branch 165 which carries rails 167. Corresponding connections 168 having rails 169 connect the device 12 to the tunnel entrances of the hardening station 14.

The device 12 includes a truck 170 which comprises a chassis 172 with wheels 174 which run on the rails 162 in the trough-like base 160 and the hinged extension 164. A service truck 176 is mounted on the truck 170 to remove the precast units from the production station 10 and to load the hardening station 14. For this purpose, the chassis 172 is constructed in the form of a trough containing rails 173 which extend transversely to the rails 162 and on which the wheels 178 of the truck 176 can run. The rails 167, 169 of the connections 165, 168 are at the same level as the rails 173 mounted on the chassis 172 so that these can be brought into alignment with the rails 167 or 169 on appropriate displacement of the truck 170. The service truck 176 on the truck 170 which thus forms a pickaback arrangement so to speak with the truck, can therefore travel at right angles to the rails 162 as soon as the truck 170 stops in front of one of the connections 165 or 168 and the rails 173 are brought into alignment with the rails 167 or 169 situated at the same height. In the present case, the truck 170 and the service truck 176 are each provided with their own electric drive. Such drives are known per se. Alternatively, cable lines or chain lines may be used.

The service truck 176 comprises a vertical frame 180 which, at the side adjacent to the production station 10 or hardening station 14 has two vertical guides 181 into which there are introduced two removable and interchangeable backs 182 which are freely displaceable upwards and downwards. The backs 182 in turn carry horizontal tines 184 one above the other so that altogether a multiple-part fork is formed which can be driven upwards or downwards, that is to say raised or lowered, by means of a geared motor 186 which is mounted at the back of the frame 180. During the picking up of pallets P with precast units, the service truck is driven up to the frame holding the pallets P so that the tines 184 of the fork engage under the pallets whereupon the fork is lifted and the pallets are raised from the seatings on the frame. The service truck, with the picked up pallets can then be driven on to the conveying truck by which it is taken to another connection at which the service truck runs off the conveying truck to deposit the pallets P on another frame. In this case, the fork is lowered to such an extent that the pallets are deposited on holders. After the fork has been lowered a little further, the service truck is free again and can be driven back.

In comparison with the conveyor device 12, the conveyor device 16 has additional connections 188 for the truck 144 of the delivery station, the rail of the delivery station and the connections being at the same height as the rail for the conveyor truck of the device 16.

The plant according to the invention is distinguished by an interrupted flow of work which is rendered possible by the devices according to the invention. Whereas in the known fixed manufacturing plants, there are areas between the individual stations in which raw materials, crude or finished products may be stored temporarily if necessary, in the plant according to the invention provision is only made for storage in the silo station and at the exit after delivery by the delivery station. The raw material is supplied to the mixing station 20 in appropriately controlled amounts from the silo station, that is to say from the cement silo 22 and from the group of bins 24 containing the aggregate. The bucket 92 of the mixing station 20 takes over the finished mixture of raw concrete and conveys it with an exclusively horizontal and vertical movement over the shaft 101 of the bunker of the production station 10. The mass of raw concrete is emptied in a vertical drop into the bunker of the production machine 100 as a result of opening the bucket 92. The production machine 100 works like a known automatic production machine and produces the precast units or small structural elements from the mass of raw concrete. These elements leave the production machine 100 on pallets. The pallets are transferred over a short conveyor path 103, see FIG. 16, into the raising ladder 102 (FIG. 13) at the output end of the production station 10. When the raising ladder 102 is filled, the service truck 176 is brought up to the raising ladder 102 over the bridge 108 so that the tines 184 of the multiple-part fork engage under the pallets and remove the pallets with the precast units from the seatings in the raising ladder as a result of lifting the whole fork. Then the service truck 176 travels backwards out of the production station 10 and returns to the conveying truck 170. The conveying truck then travels with the service truck on the rail 162 until it is in front of a connection 168 to the hardening station 14 whereupon the service truck 176 again leaves the conveying truck 170, runs into a line of tunnelling in the hardening station 14 and deposits the pallets on the holders 129 in the tunnel. The setting down is effected in the reverse manner to the picking up of the pallets from the raising ladder. The fork of the service truck is lowered to such an extent that the pallets rest on the holders 129 and the tines 184 come free of the pallets. In this manner, the service truck 176 travels backwards and forwards, by means of the conveying truck 170, between raising ladder 102 and the individual lines of tunnelling of the hardening station. In order to render interrupted work possible, four lines of tunnelling are provided in the present case at least one of which is being loaded, another emptied and the other two steam-treated at a time. Matching in time is possible, for example, in such a manner that a period of two hours is assumed for the charging and emptying of a line of tunnelling while the steam-treatment time for the precast units is set at four hours.

The charging and emptying of the hardening station is effected by a shuttle service on the conveyor means running on the devices 12 and 16. Accordingly, the entrances to the tunnels situated at the side of the device 12 are charging entrances while the tunnel openings situated at the device 16 are removal exists.

A conveying truck 170 with a service truck 176 likewise runs on the conveyor device 16 and removes the pallets with the fully hardened precast units from the holders 129 of the particular line of tunnelling to be emptied, through actuation of the fork. The truck travels backwards out of the line of tunnelling, onto the conveying truck 170 and is brought by this, at right angles to the direction of travel of the service truck, in front of the delivery station 18. The truck 144 of the delivery station is already waiting at this point in the position illustrated by the double arrow 150 and the pairs of jaws 142 are opened and receive between them the precast units arranged in groups on the pallets. As a result of actuation of the pairs of jaws 142, the precast units are picked up in groups, the tines 184 of the fork of the service truck 176 are lowered to such an extent that the pallets come free from the lower faces of the precast units and then the truck 144 is driven back into the position indicated by the double arrow 148. As a result, the way is free for the conveying truck 170. The service truck 176 with the empty pallets is driven by the conveyor truck 170 to the entrance to the production station 10 where it again leaves the conveying truck 170 in order to deposit the empty pallets in the lowering ladder 104 at the entrance to the production station 10. The empty pallets fall out of the lowering ladder 104, which is provided with holders 105 adapted for pulling outwards for this purpose, onto a conveying device which supplies them to the production machine 100 again through the cleaning device 106. After the conveying truck has passed the delivery station 18 on the return journey from the production station 10, the truck 144 of the delivery station travels forwards with the precast units held firmly between the pairs of jaws 142, into the position 152, that is to say until the tongs with the pairs of jaws come to a standstill over a platform truck standing on the rail 28. The pairs of jaws 142 are first driven together so that the precast units previously held spaced apart horizontally one above the other between the pairs of jaws form a complete packet and are deposited on the platform truck in this manner. As a result of opening the pairs of jaws 142, the tongs are released from the pile of blocks thus formed and the truck 144 travels back into the waiting position 150 after the platform truck has pulled away. The line 28 with the platform truck on it serves as a buffer store between the tongs of the delivery station 18 which unload continuously and the gantry crane 30 which is not always available and which is also used for loading vehicles taking the blocks away.

Figure 31:
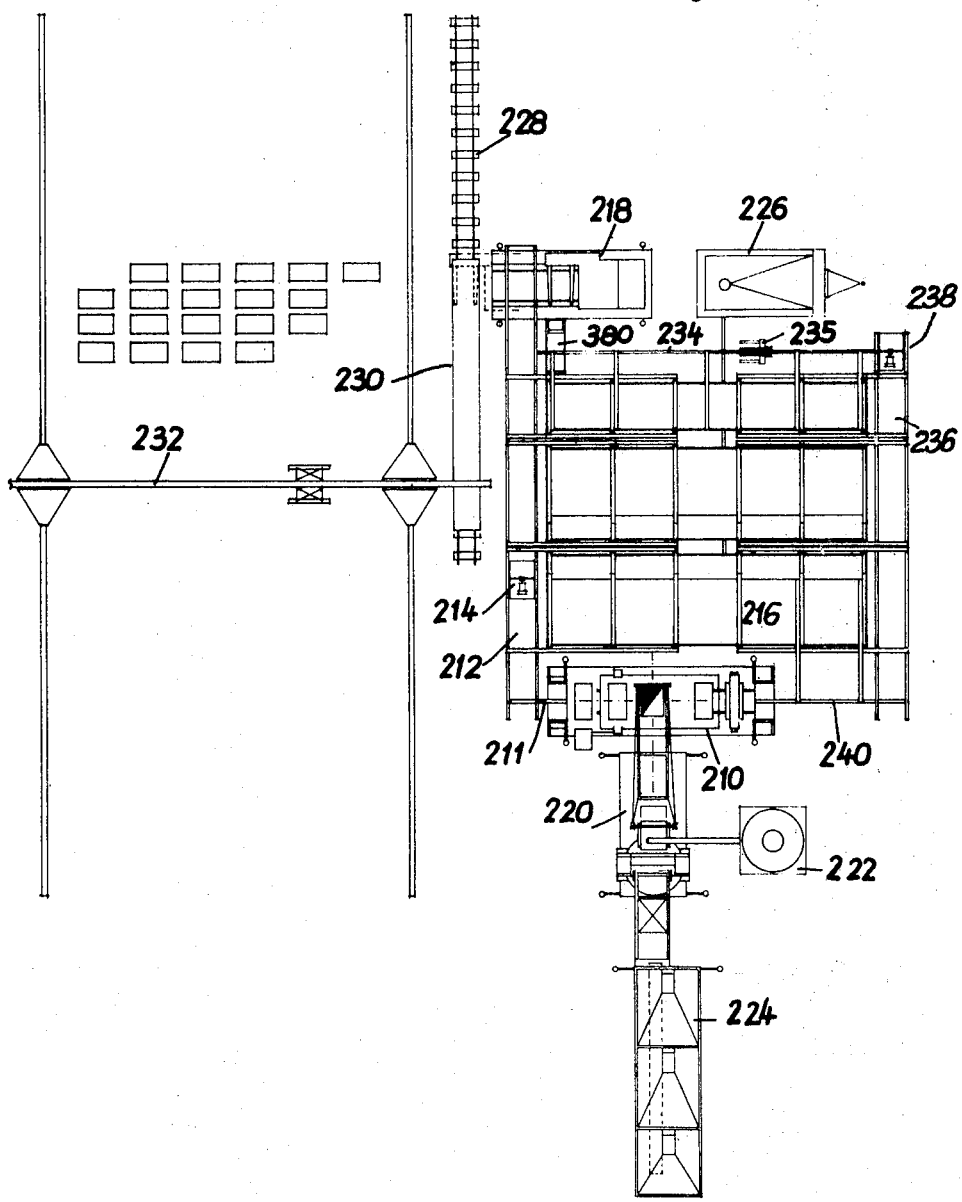
FIG. 31 shows a lay-out for another manufacturing plant according to the invention.
Figure 41:
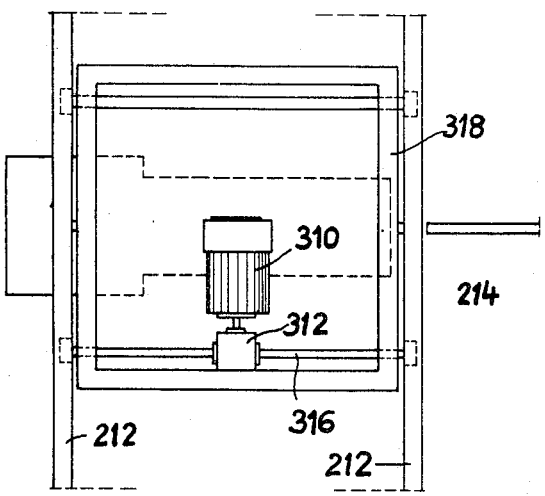
FIG. 41 shows a plan view of a trolley used in the plant shown in FIG. 31.

The lay-out illustrated in FIG. 31 affords a basic general view of a modified embodiment of a plant according to the invention. The nucleus is formed by a production station 210 the output end of which is followed by an overhead rail 212 for a trolley 214. The trolley 214 receives a second trolley or transfer carriage which can travel transversely with respect to the rails 212 on guide rails 211 and on corresponding guide rails which lead into a hardening station 216. In the embodiment illustrated, the hardening station 216 consists of a plurality of steam-treatment chambers. In the present case, five steam-treatment chambers are provided, four of which are combined in pairs to form transportable units. A fifth steam-treatment chamber is constructed in the form of an individual chamber. The number of chambers used depends on the capacity or throughput rate of the whole plant.

The production station 210 receives the raw material to be used for the manufacture of the blocks from a mixing station 220. A silo station 224 for the aggregate is provided before the mixing station 220 and also a silo 222 for cement. Conveyor means connect the units 224 and 222 to the mixing station 220 which in turn supplies the ready mixed raw material to the production station 210 over a bridge arrangement.

The chambers of the hardening station 216 are charged from the side of the rail 212. The emptying of the chambers also takes place via this rail. The rail 212 extends beyond the hardening station 216 to a delivery station 218. At the delivery station 218 there is a line 228 on which is displaceable a platform truck 230 which receives the blocks taken over from the delivery station 218. A gantry crane 232 serves to transfer the blocks from the platform truck 230 to aroad vehicle or to deposit them in a storage depot.

The chambers of the hardening station 216 are supplied with steam which is produced in a mobile steam generating plant 226. The rails 212 are connected, by means of a guide rail 234 on which a transfer carriage 235 can travel, to rails 236 on which there travels a trolley 238. The rails 236 are conected to the pallet input of the production station 210 through a guide rail 240 for the transfer carriages of the trolley 238.

The rails 212, 234, 236 and 240 accordingly form, together with the production station 210, a circuit the sections of which are covered by the trolleys 214 and 238 and transfer carriage 235. The hardening station 216 is disposed inside the circuit, while the delivery station 218 is disposed outside the circuit at the end of the rails 212.

In accordance with the illustration in FIGS. 2 and 5, the production station 210, see FIGS. 32 to 35, is provided with hydraulically actuated rams 260 which are mounted for swinging out on holders 258 at the longitudinal sides of the station. The station is equipped with six jacks 260. FIG. 32 shows the station in the transport state on a low-loader. FIG. 33 shows the station seen from the right-hand end in FIG. 32, still on the low-loader, but with the jack 260 swung outwards on the holders 258 and the jacks extended from the cylinders 260. FIG. 34 shows a plan view and FIG. 35 a side view of the station in the operational state, the device having been set down on sleepers after the low-loader has been withdrawn.

A production machine 264 known per se is mounted on the fixed base of the production station 210. The production station 210 is erected in such a manner that, together with the mixing station 220, it forms a T and the mouth of the shaft 266 of the bunker of the production machine is situated immediately below the outer end of the conveyor bridge of the mixing station 220.

In the illustration in FIGS. 34 and 35, the direction of operation in the production station 210 is from right to left. Mounted on the right, before the production machine 264, is a board store 272 which receives the pallets in stacks and surrenders them individually. The pallets travel out of the store, through a pallet cleaning device 276, and are so re-supplied to the production machine 264. The pallets loaded with precast units, coming from the machine 264 are supplied to a raising ladder 268 over a conveyor path 267. A guide rail 211 leads from the raising ladder to the rail 212. Travelling on the guide rail 211 is a transfer carriage 270 which receives the pallets loaded with precast units from the raising ladder and travels into the trolley 214 which displaces the transfer carriage 270 transversely with respect to the guide rail 211 to one of the chambers of the hardening station 216.

The pallet store 272 is connected to the rails 236 by a guide rail 240 so that a transfer carriage 235 can enter the pallet store 272 and then, after surrendering the empty pallets, returns to a trolley 238 which travels backwards and forwards on the rails 236. A conveyor device 274 connects the pallet store 272 to the cleaning device 276 and conveys the emerging pallets P on to the production machine 264.

In this station, the whole control and hydraulic installation is combined in one housing 262 which is mounted on a platform travelling in a guide. During operation, the housing 262 is swung laterally out of the path of movement of the pallets, see FIG. 34. Conversely, during the transport of the production station 210, the housing 262 is slid laterally into the base of the station in order that the maximum permissible transport width for the production station may not be exceeded.

The hardening station 216 consists of a plurality of chambers, which are preferably combined in pairs to form transport units. Such a double chamber 280 is illustrated in FIG. 36. It is likewise provided with jacks 282 which permit automatic unloading from a transporter or loading on such a vehicle. In the embodiment illustrated here, the jacks 282 aer not adapted for swinging out but are mounted on the sides of two shells 281, 283 which form the outer walls of the chambers and are slid one inside the other for transport, see FIG. 36. In order to erect the double chambers, the shells 281, 283 are first driven apart. Hydraulic cylinders 284 are provided for this purpose and connect hoops 285 which are secured to the shells 281 and 283. After the shell 283 has been slid laterally out of the shell 281, the jacks 282 are actuated as a result of which the double chamber can be lifted from the low-loader and this can be withdrawn from under the double chamber. Then the double chamber is deposited on sleepers. In this case, too, individual actuation of the jacks 282 permits accurate adjustment of the double chambers in a horizontal position or re-adjustment should this be necessary in the course of operation. The individual jacks and hydraulic cylinders for each double chamber 280 are actuated by a control and hydraulic plant 308 which is mounted in the region of the floor of the chamber 280. Control connections and pressure hoses. not illustrated, lead from the plant 308 to the individual cylinders.

Secured in the shell 281 is a vertical longitudinal wall 286 which separates the two lines in the double chamber from one another. Hinged floor and ceiling members 288 and 290 respectively are provided in the shell 283 and lock the chamber shells in the operational positioned by being swung upwards or downwards after the shells 281 and 283 have been pulled apart. On the ceiling of each of the chambers there is mounted a guide rail 292 which, in the shell 283, is mounted under the ceiling portion 290. Holders or ledges 294 projecting laterally are provided on the walls of the chambers and receive the pallets loaded with the precast units. Each line of the double chamber is closed individually by a drop door 300 which is actuated by a hydraulic cylinder 302. Because of the operation involving trolleys and transfer carriages, the door is articulated at the lower edge of the floor and folds downwards, see FIG. 39. During operation, the trolley 214 travels on the rails 212 in front of a chamber the door 300 of which is open, while a limit switch ensures that the trolley 214 stops with its carrier rail precisely in line with the guide rail 292 of the open chamber. Then the transfer carriage 270 carried by the trolley 214 can drive into the open chamber and deposit the pallets on the ledges 294.

FIGS. 57 to 60 show details of the door arrangement for the double chamber or the double tunnel, the remaining parts of the chamber or of the tunnel being illustrated in greatly simplified form. The doors 300, 400 of the lines of double chambers or of the double tunnel situated side by side are adapted in such a manner that during transport the door 300 is set forward somewhat so that the shell 281 with the door 400 can be pushed inside the shell 283 with the door 300. For this purpose, the door 300 is mounted on hinges 402 which are mounted on rods which extend parallel to the chamber or tunnel axis and can be displaced outwards by means not illustrated for the transport of the tunnel, see FIG. 58. The position of the hinges 404 for the door 400 on the other hand, remains unaltered. Each door 300 or 400 comprises, at its upper edge, an excision 406 which allows for the position of the guide rail 292 or of a carrier rail 320 on the trolley 214. The excision may be closed by plates engaging in the rail section or by a slide arrangement not illustrated in detail here.

In the embodiment illustrated here, the rails 212 and 236 for the trolleys 214 and 238 respectively are secured for easy detachment to overhung members 304. The rails can be removed from the overhung members 304 for the conveyance of the hardening station. The overhung members 304 are extensibly secured to the shells of the chamber 280 so that they can be retracted for the conveying of the hardening station to such an extent that they do not project beyond the front of the chamber units. This position is illustrated by the broken line 304' in FIG. 39.

Extending parallel to the longitudinal axis of a chamber, at the outside, see FIG. 40, is a guide rail 234 which is secured to extensible overhung members 306 and is pushed against the outside wall of the chamber shell for the transport of the chamber. Mounted on the guide rail 234 is a transfer carriage 235 which receives the pallets in stacks from a pallet holder 380 in which the pallets are deposited by the transfer carriage 270 after the precast blocks have been transferred to the delivery station. The transfer carriage conveys the pallets to the trolley 238 from which a return to the entrance to the production station is possible over the rails 236.

If the operation in the plant renders an odd number of steam-treatment chambers or tunnels necessary, an individual chamber or tunnel may be used in addition to the double chambers or tunnels which are illustrated in FIGS. 36 to 40, see FIGS. 52 to 56. In the present case, a chamber is illustrated which is charged from one end and emptied again from the same end. In its fundamental construction, such a chamber 480 corresponds to the double chamber shown in FIGS. 36 to 40. The chamber 480 is also provided with jacks 482 which are actuated or supplied with pressure medium from a hydraulic installation 508 mounted in the chamber itself. The jacks 482 can be selectively actuated simultaneously and in the same sense or individually. FIG. 52 shows the individual chamber on a transport low-loader. For the unloading, see FIG. 53, the jacks 482 are extended downwards so far that the chamber 480 is lifted from the low-loader. Then the low-loader is withdrawn from beneath the chamber 480 and the chamber deposited on sleepers laid underneath, see FIG. 54, the jacks being retracted again for this purpose. The chamber is likewise provided with devices, such as a hose levelling instrument, which enables adherence to the horizontal to be supervised.

Since it is a question of an individual chamber, the interior of the chamber is simpler in construction than the double chambers. A guide rail 492 for the transfer carriage 270 is provided on the ceiling of the chamber. In addition, the chamber walls comprise supporting ledges 494 on which the pallets can be deposited by the transfer carriage. A drop door 500 which hinges downwards, and which is actuated by a hydraulic cylinder 502, closes the chamber. The drop door 500 corresponds essentially to the embodiment of a drop door for a double chamber illustrated in FIGS. 57 to 60.

Like the chambers 280, the chamber 480 has a double function because it is used at the same time as a support for parts of the conveyor device. For this purpose, the extensible supporting arms 504 are mounted at the front and rear of the chamber. The retracted position of these supporting arms is illustrated at 504'. The rails 212 and 236 for the trolleys 214 and 238 are secured to the supporting arms 504. A guide rail 234' is mounted on extensible supporting arms 506 along one side of the chamber 480. The transfer carriage 235 of the trolley 238 is adapted to travel along this guide rail 234' in order to remove pallets from the pallet holder 380 which is mounted immediately beside the rails 212 between delivery station 218 and the outlet from the chamber 480 so that, after the finished precast blocks have been received in the delivery station 218 the empty pallets can be delivered to the pallet holder 380 by the transfer carriage 270. For this purpose the guide rail 234' extends far enough to join to a carrier 320 for the trolley 270.

Figure 42:
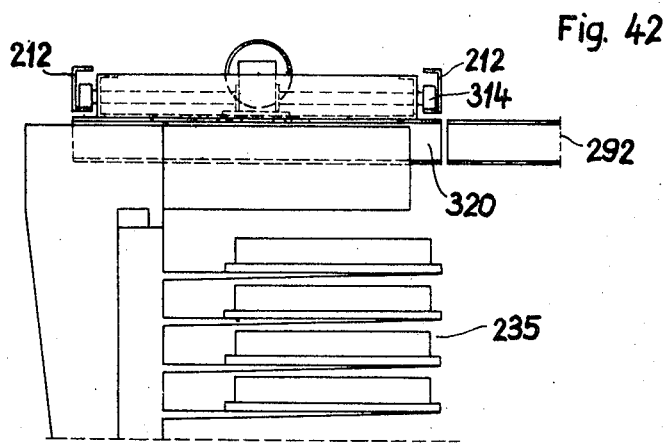
FIGS. 42 and 43 show two different side views of the upper portion of the trolley shown in FIG. 41.
Figure 43:
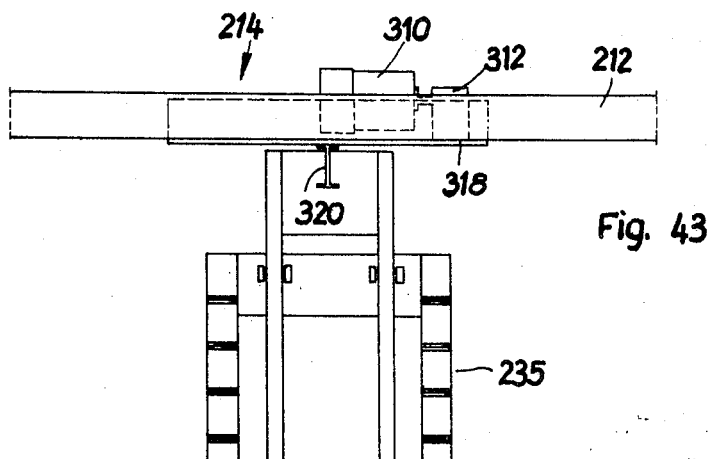
Figure 48:
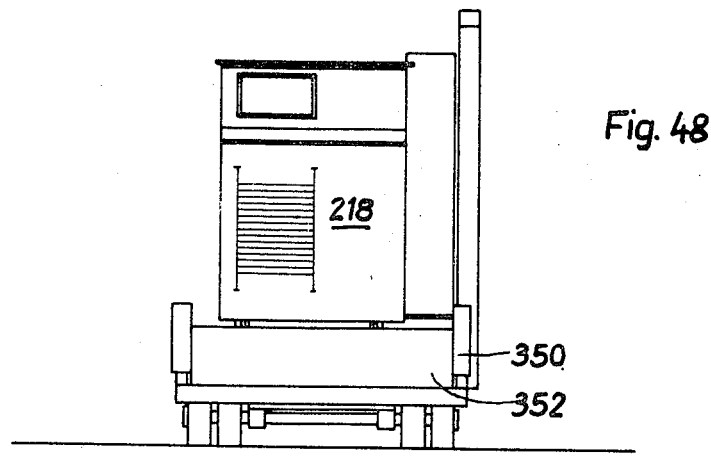
FIGS. 48 and 49 shows a device serving as a delivery station for the plant as shown in FIG. 31, in front view and side elevation on a carrier.
Figure 49:
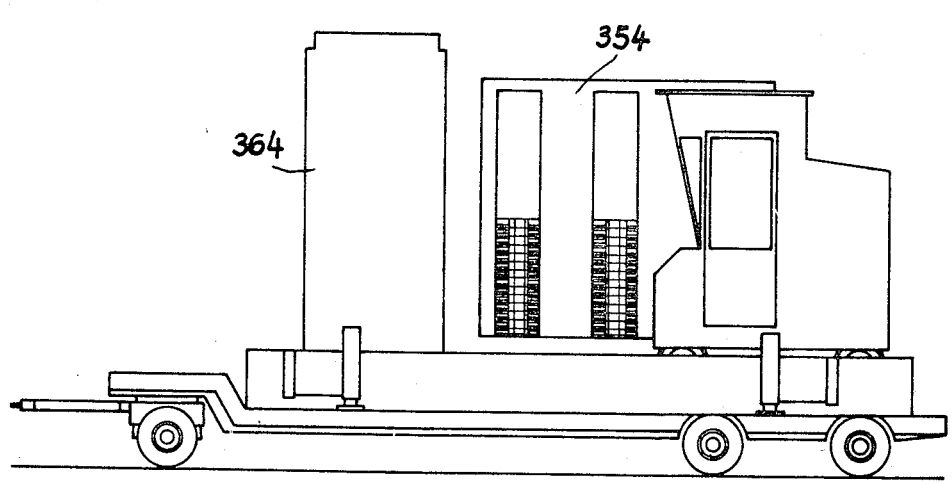
Figure 50:
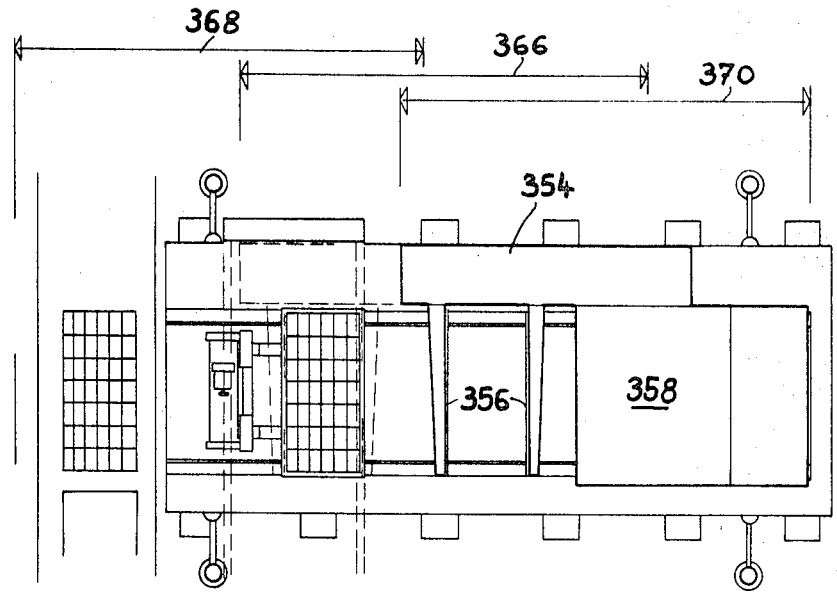
FIG. 50 shows a plan view of the device shown in FIGS. 48 and 49 during operation.
Figure 51:
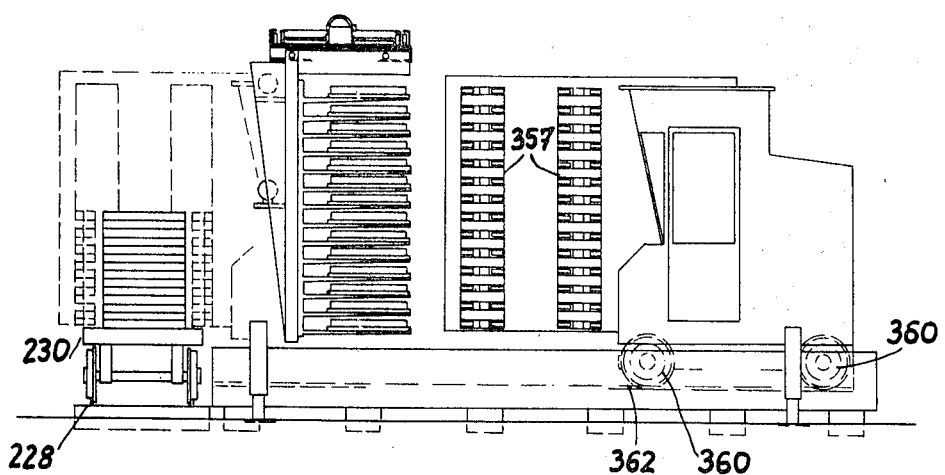
FIG. 51 shows a side view of the device shown in FIG. 50.

The preferred embodiment of the trolley used here and of the transfer carriage 270 to be received thereby is explained in more detail with reference to FIGS. 41 to 47. The trolley 214, which is constructed in the same manner as the trolley 238, comprises a frame 318 on which rollers 314 are mounted. The rollers 314 run on the rails 212 which in the present case are formed by a pair of channel sections, the openings in which are facing one another. A pair of rollers 314 is connected by an axle 316 which is mounted in the frame 318 and driven by a motor 310 through a gear 312. Furthermore, secured to the frame 318 is a carrier rail 320 which is of H-section or I-section and lies transversely with respect to the direction of the rails 212. The arrangement is selected in such a manner that the carrier rail 320 is situated at the same height as the guide rails 211, 292, 234 and 240. FIG. 42 shows the trolley 214 with the transfer carriage 270 mounted thereon from a guide rail 292 which is in line with the carrier rail 320.

The transfer carriage 270 consists essentially of an arm extending vertically downwards which, in the present case, is formed from two sections 322 of like construction situated side by side. Mounted between the sections 322 is a motor 324 which, through a drive connection 325, 328, drives rollers 330 which run on the lower flanges of the I-section 292 (or 211, 320, 234, 240 respectively).

The sections are rigidly connected to one another by cross pieces, for example 332, 334 and 336. Horizontal supports 40 are mounted for displacement in the vertical direction on the arm formed by the sections 322. For this purpose, the supports 340 are mounted on rails 338 which are connected to form a rigid frame by cross-bracing, for example 339. Between the cross-bracing 339 and 332 there is mounted a double-acting hydraulic cylinder 342 which is actuated through pressure hoses by a pump 344 connected to an oil supply. When the jack of the cylinder 342 is extended, see FIG. 47, the horizontal supports 340 and hence the pallets P resting on the supports and carrying the blocks S for example are raised. FIG. 45 shows in dotted lines the supports 340 in the raised position in comparison with FIG. 44. The arrows 346 and 348 respectively and the double arrow illustrated in FIG. 47 likewise indicate the displacement of the supports 340 in the vertical direction.

The transfer carriage 235 corresponds essentially to the carriage 270. As FIGS. 39 or 55 show in particular, the transfer carriage 235 comprises only one horizontal support 390 which may also be a horizontal fork or plate and is secured to a vertical rail 392 which is adapted for displacement on a vertical arm 394. For this purpose, racks, not illustrated, may be secured to the rail 392 and mesh with pinions, likewise not illustrated in detail, which are mounted on the arm 394 and driven by the motor 396. In contrast to the carriage 270, the supports 340 of which are only adjusted vertically over a relatively short distance, the support 390 is raised from its lowest position in which it can travel below the pallet holder 380 until the pallets present in the pallet holder are pushed together to form a stack which is then removed from the holder 380 by the carriage 235. The pallets are then conveyed further on the carriage 235.

In accordance with the device 244, the delivery station 218, see FIGS. 48 to 51, is provided with hydraulically actuated jacks 350 which are mounted for swinging out on the fixed base 352 of the station. The delivery station 218 comprises a vertical frame 354 on which are mounted multiple-part tongs which consist of a plurality of pairs of jaws 356 disposed precisely one above the other and adapted for actuation simultaneously and in the same sense. The frame 354 is rigidly mounted on a carriage 358 which is adapted to travel by means of wheels 360 on rails 362 which are laid in the base 352. The two jaws of a pair of jaws 356 are adjustable in the horizontal plane; in addition, the pairs of jaws 356 situated one above the other and between which there are provided gaps 357 are adjustable in the vertical direction so that the gaps 357 can be increased or reduced until the pairs of jaws 356 lie directly one upon the other. These tongs serve to grasp precast units disposed in a plurality of planes one above the other simultaneously with the pairs of jaws.

The delivery station 218 is further provided with a boundary wall 364 which extends as a closure between the rails 212 and terminates the travel of the trolley 214. The mode of operation of the delivery station is such that the carriage 358 with the frame 354 and the pairs of jaws 356 first assumes the position represented by the arrow 366, the pairs of jaws being set in such a manner that they engage between the supports 340 of the transfer carriage 235 which is displaced into the delivery station by the trolley 214. As a result of actuation of the pairs of jaws 356, the precast units are grasped on the pallets P and raised slightly whereupon the trolley travels out of the delivery station with the transfer carriage. Then the carriage 358 with the precast units grasped between the pairs of jaws 356 travels into the position 368 in which the precast units are deposited, as a result of the pairs of jaws 356 coming together, on the carriage 230 which is standing on the line 228. The arrow 370 indicates a position of rest of the carriage 358. Although the positions 366 and 368 are sufficient for the course of operations with the construction illustrated here, the device having the position of rest 370 can be used in many ways.

The essential advantage of the plant according to the invention lies in the fact that it can be erected in a relatively small area quickly and without any special local preparations and can be dismantled again just as quickly. Because of the fully automatic course of operation, only a few operators are needed for supervision. In contrast to conventional stationary concrete factories, in the new plant conveying is substantially horizontal. The vertical conveying which plays an important part in the conventional concrete factories built vertically has been restricted in the new plant to a small fraction of what it was.

A further advantage of the plant according to the invention consists in that the pallets are always conveyed and handled in groups both in the loaded and in the empty state. In contrast to conventional plants, the plant according to the invention has no intermediate stores between individual stations. Only at the delivery station is a line provided with receiving trucks which serves to compensate for irregularities in the removal of the blocks from the plant. Thus there is a further advantage in comparison with known plants in which fork-lift trucks and setting down devices are used which travel over a relatively large area to various points in order to deposit finished blocks there.

No special constructions whatsoever extending into the earth are necessary for erecting the plant according to the invention. All the devices of the installation are mounted with their working parts in frames and scaffolds so high above the erection surface that servicing, for example, can be carried out without pits.

What we claim is:

1. A plant for manufacturing small structural concrete elements, comprising a silo station for the storage or concrete components, a mixing station receiving said components from said silo station and mixing said components together, a production station having a production machine for shaping said elements on pallets from concrete mixed in the mixing station, a hardening station for hardening said concrete elements received from said production station, a delivery station for removing from the pallets and delivering from the plant concrete elements received from said hardening station, closed circuit conveyor means for conveying pallets with said elements thereon from said production station to said hardening station and from said hardening station to said delivery station and for conveying empty pallets from said delivery station back to said production station, and means for loading and unloading said conveyor means and each of said stations onto and from carrier vehicles.

2. A plant as claimed in claim 1, characterized in that hydraulic unloading and erecting means (38, 36) are provided on the means forming the individual stations and comprise a plurality of adjusting members (38) which are distributed around the lower circumference of the device and are adjustable jointly or independently of one another.

3. A plant as claimed in claim 2, characterized in that each said station is provided with a complete hydraulic lifting mechanism (38) including pump unit and control (36) which controls the simultaneous actuation of a plurality of jacks or an independent individual adjustment of the jacks, the stations being equipped with means (44) for supervising the horizontal position.

4. A plant as claimed in claim 1, characterized in that the means which form the mixing station, the production station, the hardening station, and the delivery station are each complete units substantially ready for operation.

5. A plant as claimed in claim 1, characterized in that the working devices in all the stations are mounted in frames or scaffolds at a distance above the erection surface.

6. A plant as claimed in claim 1, characterized in that the production station and the hardening station and the conveyor means connecting them substantially form a rectangle when assembled for operation and that the mixing station is erected with the direction of throughput at right angles to the direction of throughput of the production station.

7. A plant as claimed in claim 1, characterized in that, provided in the mixing station (20) is a mixer (80) with a free space below the discharge aperture into which there can be displaced horizontally a receiving bucket (92) which can be conveyed by a vertical hoist (94) standing beside the mixer and be conveyed over a further horizontal displacement section (95) for emptying over the bunker of the following production station (10), a telescopically retractable and extensible tower being provided for the vertical hoist.

8. A plant as claimed in claim 1, characterized in that a production (200) is combined, in the production station (10) with a raising ladder (102) and a lowering ladder (104), serving as a pallet store, including a pallet cleaning device (106).

9. A plant as claimed in claim 8, characterized in that the hydraulic installation (112) in the production station (10) comprises a pump and a control which are adapted, as a unit, for withdrawal from the frame of the station sideways with respect to the direction of throughput.

10. A plant as claimed in claim 1, characterized in that the hardening station (14) comprises at least one heating chamber which is provided with a closeable opening and which forms a unit adapted for loading on a carrier and unloading therefrom respectively.

11. A plant as claimed in claim 1, characterized in that the hardening station (14) contains at least two heating tunnels which are combined to form a transportable unit and form closed devices, and which are disposed parallel with one another with their entrance and exit being respectively adapted for closing by substantially steam-tight doors (103).

12. A plant as claimed in claim 11, characterized in that the two tunnels of a pair comprise two shells (114, 116) adapted for sliding one inside the other and for pulling out respectively perpendicular to the longitudinal axis of the tunnel.

13. A plant as claimed in claim 12, characterized in that a guide mechanism (128) for a conveyor means and holders (129) for depositing pallets are disposed in each shell (114, 116).

14. A plant as claimed in claim 7, characterized by at least one mobile steam-generating plant (26) to which tunnels (14) can be connected up.

15. A plant as claimed in claim 14, characterized in that the tunnels of the hardening station (14) comprise connections (134, 136) whereby the individual tunnels can be connected for the transfer of steam from the one tunnel to the other.

16. A plant as claimed in claim 1, characterized in that the delivery station (18) comprises tongs having a plurality of pairs of jaws (142) which are disposed one above the other and parallel with one another in alignment along an axis of symmetry and which can be actuated simultaneously.

17. A plant as claimed in claim 16, characterized in that the pairs of jaws (142) are movable in relation to one another along the axis of symmetry.

18. A plant as claimed in claim 16, characterized by hydraulic actuation of the jaws of a pair and by hydraulic variation in the spacing between the individual pairs of jaws (142).

19. A plant as claimed in claim 16, characterized in that the tongs formed by the pairs of jaws (142) are mounted on a carriage (144) which can be displaced horizontally forwards or backwards in one direction.

20. A plant as claimed in claim 1, characterized in that the hardening station is provided with through-passage tunnels the direction of passage through which is opposite to the direction of passage of the pallets through the production station, the delivery station being disposed in a gap within the rectangle formed by the production station and hardening station.

21. A plant as claimed in claim 1, characterized in that the conveyor means connecting the production station, the hardening station and the delivery station to form a circuit, consist of two complete devices which are substantially alike in construction and which are adapted for loading on carriers and unloading therefrom respectively and each of which comprises a main rail track member (162) with cross tracks (167, 169) at right angles thereto which are hinge-mounted on the device carrying the main rail track member.

22. A plant as claimed in claim 21, characterized in that, mounted for displacement on the main rail track member (162) is a first truck (170) which carries a second truck (176) which comprises holders (184) for pallets and travels at right angles to the first truck on the cross tracks (167, 169) which link up in height with a platform (172) on the first truck (170) receiving the second truck (176).

23. A plant as claimed in claim 22, characterized in that the holders (184) for receiving the pallets are disposed interchangeably one above the other and are adjustable in height.

24. A plant as claimed in claim 22, characterized in that the trucks (170, 176) are provided with their own drive for displacement on the tracks and for the adjustment of the holders (184).

25. A plant as claimed in claim 21, characterized by connection pieces (108) for the cross track (167) which are hinge-mounted on the production station (10).

26. A device as claimed in claim 1, characterized in that the hardening station is disposed immediately beside the production station without any gap, the tunnels of the hardening station being constructed in the form of chambers which are completely sealed at one end and the other end of which is provided with a door closing in a steam-tight manner as an entrance and exit and is situated beside the exit from the production station.

27. A device as claimed in claim 1, characterized in that the devices associated with the hardening station are constructed in the form of supports for the conveyor devices for which connections are provided at the production station and the delivery station, holding members for the conveyor devices being mounted on the hardening station so as to be extended therefrom.

28. A device as claimed in claim 27, characterized by rails which are mounted on overhung members and which convey around the hardening station, in close proximity thereto, trucks which comprise supporting rails for a second transfer carriage adapted for displacement perpendicular to the rails of the trolley.

29. A device as claimed in claim 28, characterized by a downwardly projecting arm which is mounted on the chassis of the transfer devices and which comprises horizontal supports, adjustable vertically, as holders for pallets.

30. A device as claimed in claim 28, characterized in that the trolleys and the transfer carriages have their own drive and the transfer devices are additionally provided with drives for adjusting the pallet holders.

31. A device as claimed in claim 28, characterized in that guide rails for the transfer carriages are provided on the ceiling of the chambers of the hardening station and are situated at the same level as the supporting rails for the trolleys for which rails are provided externally at both sides of the hardening station and transversely with respect to the guide rails and which are connected to the entrance and exit of the production station respectively by lengths of guide rail.

32. A device as claimed in claim 31, characterized in that the hardening station comprises a plurality of chambers disposed parallel side by side and that the last chamber at the side of the hardening station remote from the production station carries externally, on overhung members, guide rails which connect the running rails at the two ends of the chambers.

References Cited

UNITED STATES PATENTS

| | | | |
|---|---|---|---|
| 1,838,672 | 12/1931 | Hanley | 25—2 |
| 3,217,375 | 11/1965 | Kinnard | 25—41 |
| 3,384,939 | 5/1968 | Baker | 25—2 |
| 3,430,308 | 3/1969 | Alsburg | 25—2 |
| 3,448,496 | 6/1969 | Arnold | 25—2 |

FOREIGN PATENTS

| | | |
|---|---|---|
| 704,810 | 3/1965 | Canada. |
| 1,327,037 | 4/1963 | France. |
| 341,594 | 1/1931 | Great Britain. |
| 74,900 | 6/1954 | Netherlands. |

OTHER REFERENCES

German printed application, No. K 17,805, Aug. 2, 1956, Keller.

J. SPENCER OVERHOLSER, Primary Examiner

B. D. TOBOR, Assistant Examiner

U.S. Cl. X.R.

25—41